United States Patent [19]

Duncan, IV et al.

[11] Patent Number: 4,797,855

[45] Date of Patent: Jan. 10, 1989

[54] WORD PROCESSOR HAVING SPELLING CORRECTOR ADAPTIVE TO OPERATOR ERROR EXPERIENCE

[75] Inventors: Howard C. Duncan, IV; R. William Gray, both of Ithaca; Joseph P. Battista, Homer, all of N.Y.

[73] Assignee: Smith Corona Corporation, Cortland, N.Y.

[21] Appl. No.: 700

[22] Filed: Jan. 6, 1987

[51] Int. Cl.$^4$ .......................... G06F 3/02; G06F 11/00; G06F 11/34

[52] U.S. Cl. ..................................... 364/900; 400/63; 400/61

[58] Field of Search ... 364/200 MS File, 900 MS File; 400/61, 63, 110

[56] References Cited

U.S. PATENT DOCUMENTS

| | | | |
|---|---|---|---|
| 3,739,348 | 6/1973 | Manly | 364/900 |
| 4,164,025 | 8/1979 | Dubnowski | 364/900 |
| 4,342,085 | 7/1982 | Glickman et al. | 364/300 |
| 4,355,371 | 10/1982 | Convis et al. | 364/900 |
| 4,480,931 | 11/1984 | Kamikura et al. | 400/63 |
| 4,481,607 | 11/1984 | Kobayashi et al. | 364/900 |
| 4,484,305 | 11/1984 | Ho | 364/900 |
| 4,580,241 | 4/1986 | Kucera | 400/63 X |
| 4,650,349 | 3/1987 | Westreich | 400/98 |
| 4,689,768 | 8/1987 | Heard et al. | 400/63 X |

*Primary Examiner*—Raulfe B. Zache
*Assistant Examiner*—Danh Phung

[57] ABSTRACT

A word-processing system or memory typewriter has the usual keyboard, input display and/or printer; together with a spelling dictionary stored within the memory, and an error signal generating device activated upon entry of an incorrect word. For greater efficiency and ease of use by the operator, the memory also stores several kinds of correction information—e.g., typographical correction, transposition reversal, phonetic substitutions, etc.—suitable for amending the incorrect word to display a trial word which matches one from the above-mentioned stored dictionary, the amending occurring by depression of a special key whenever entry of an incorrect word activates the error-signal device. Statistical control of selection of the class of correction information is provided, the order of utilization of the various classes depending upon the relative extent of the operator's prior successful usage of each class of information. If the trial word displayed is not satisfactory, the operator can depress the usual Index key 20I on the keyboard for presentation of yet another amended word matching the contents of the dictionary, and so on until the operator is satisfied with the one presented and signals the system to print that choice. If a match cannot be obtained with any of the information, the display indicates this fact to the operator.

10 Claims, 11 Drawing Sheets

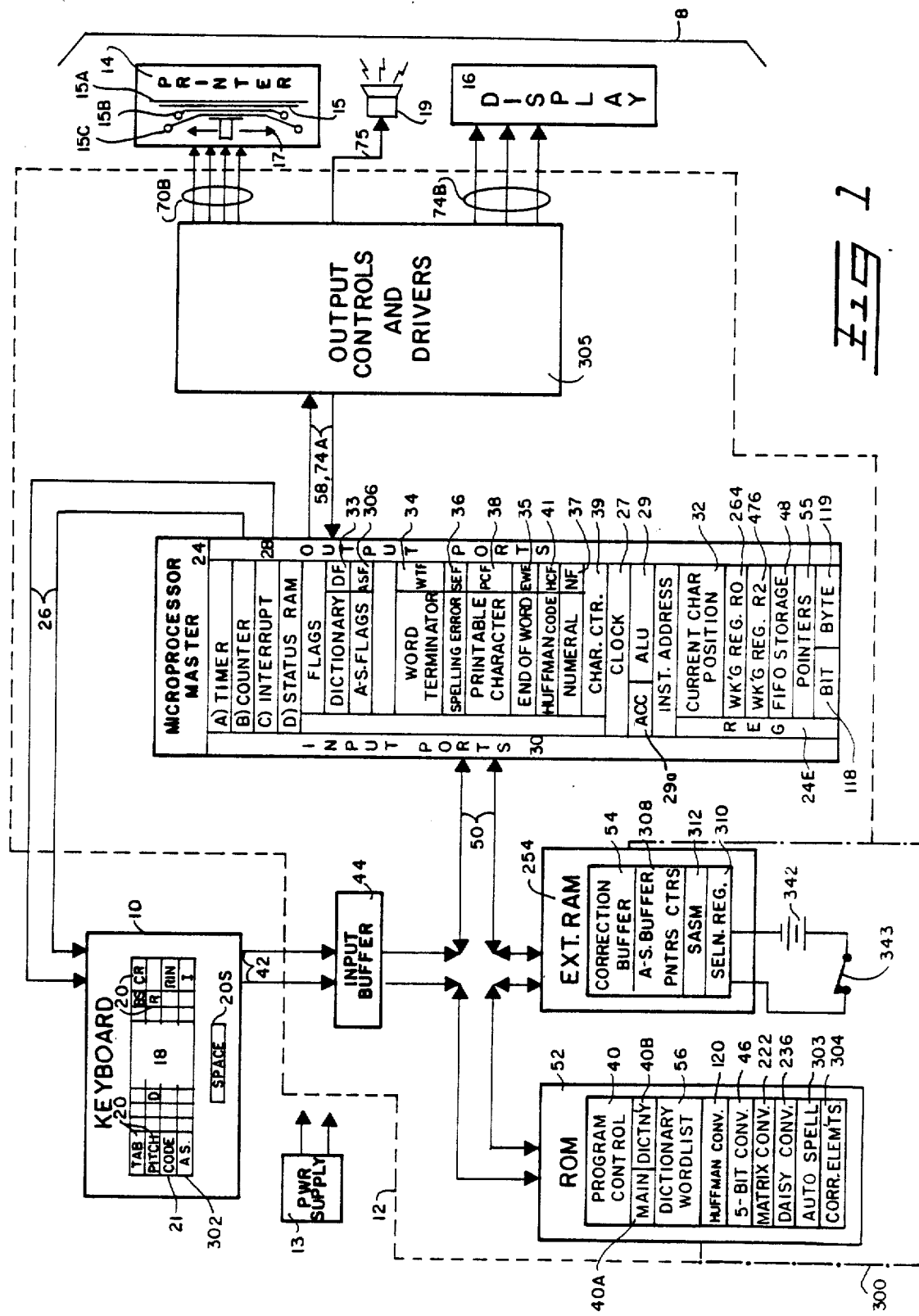

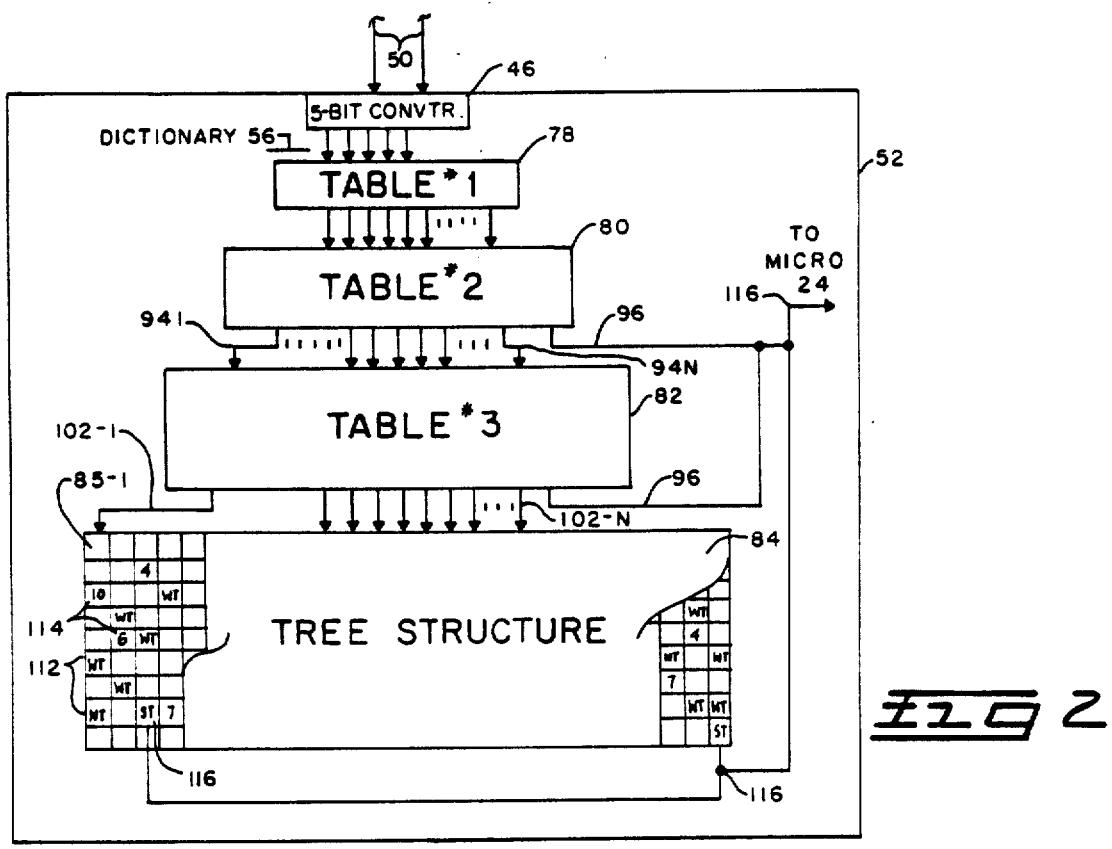

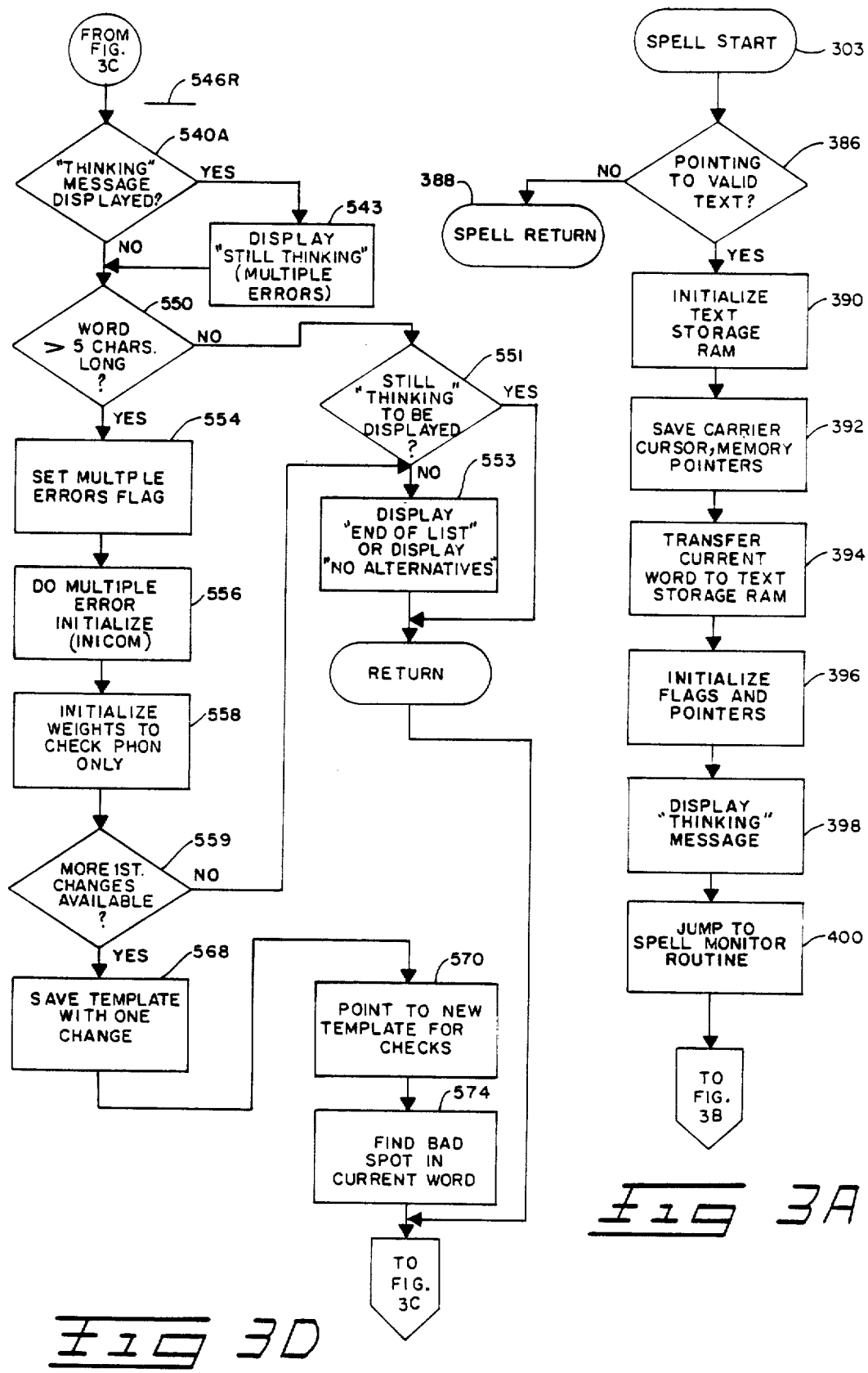

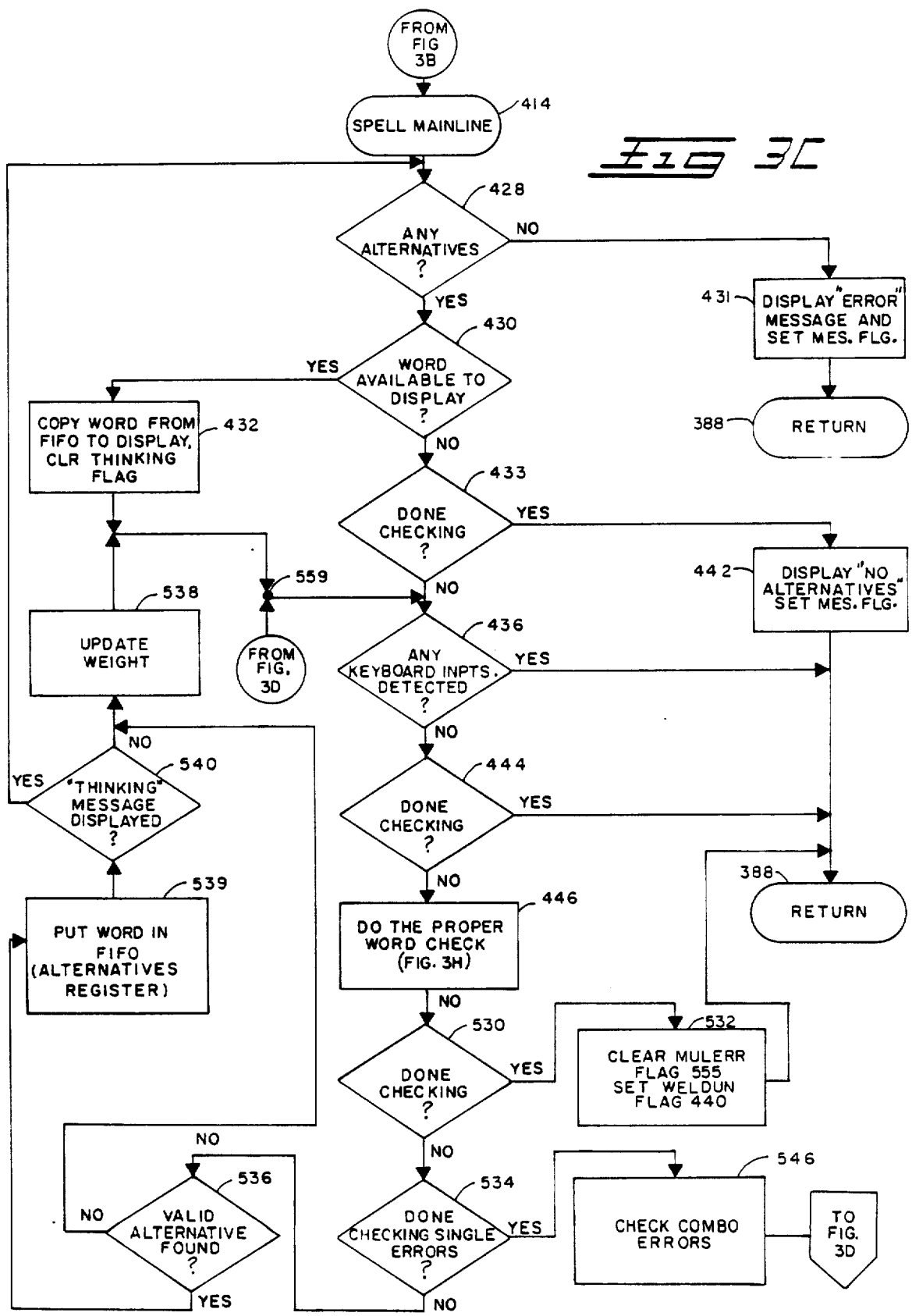

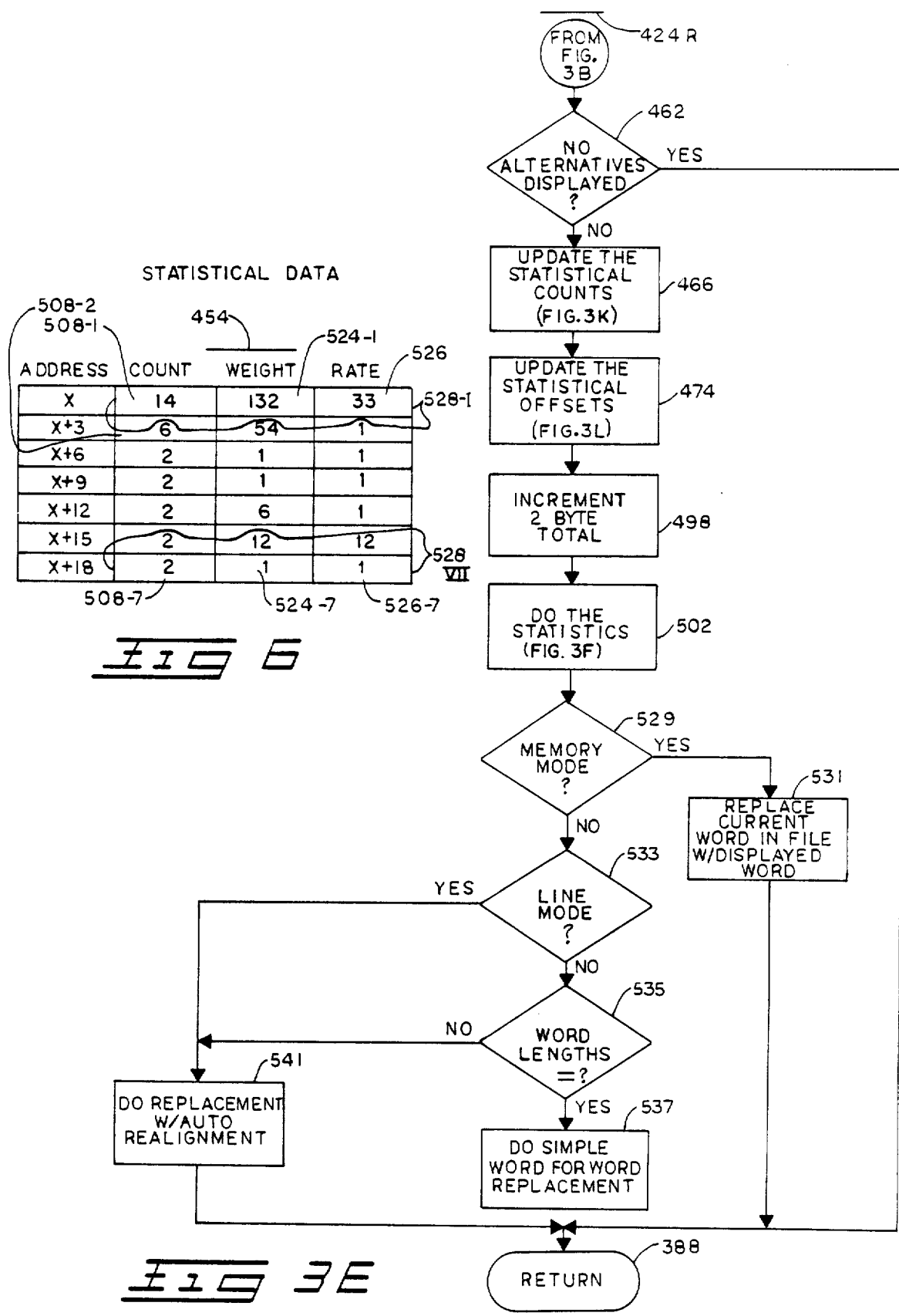

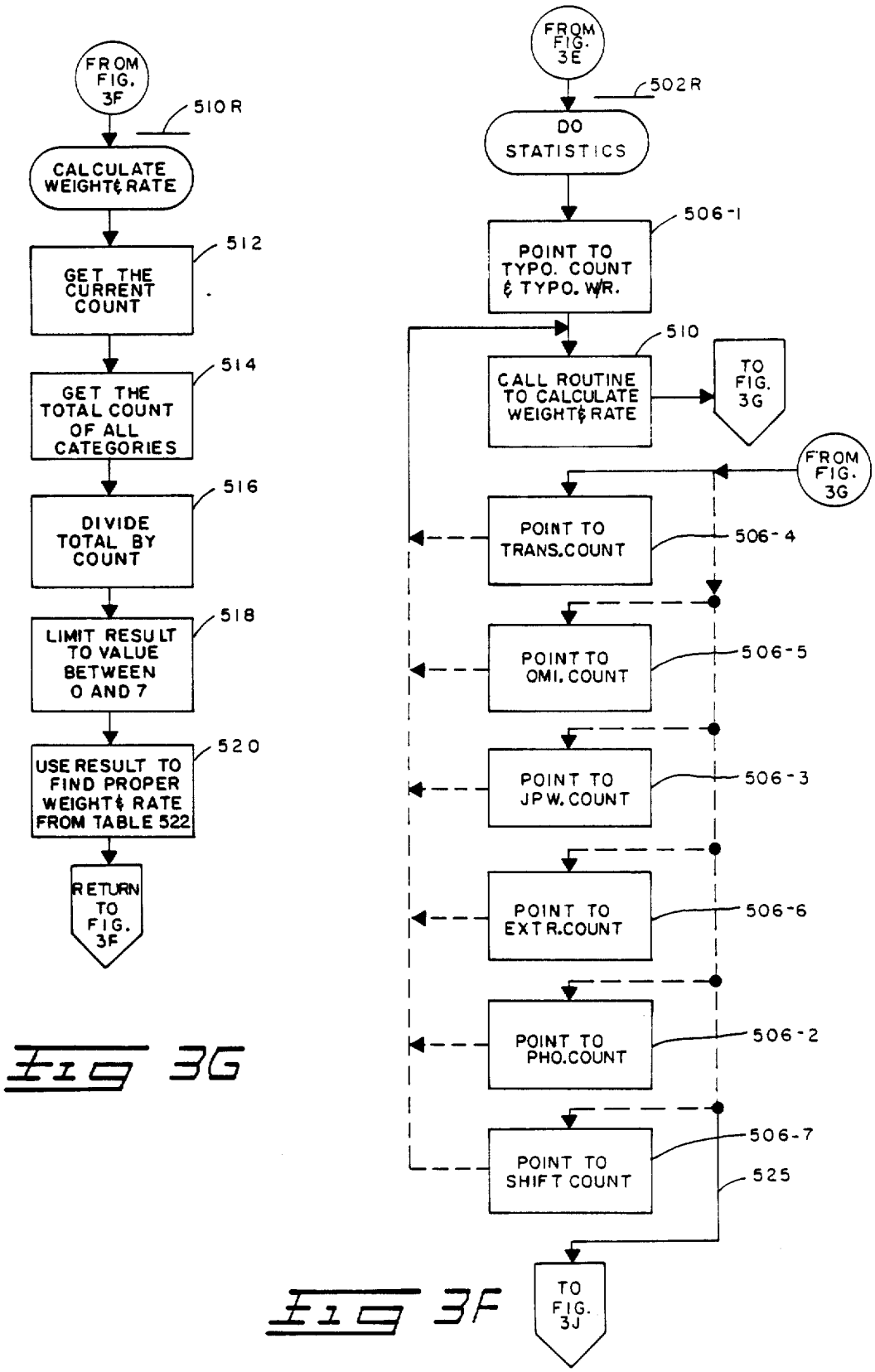

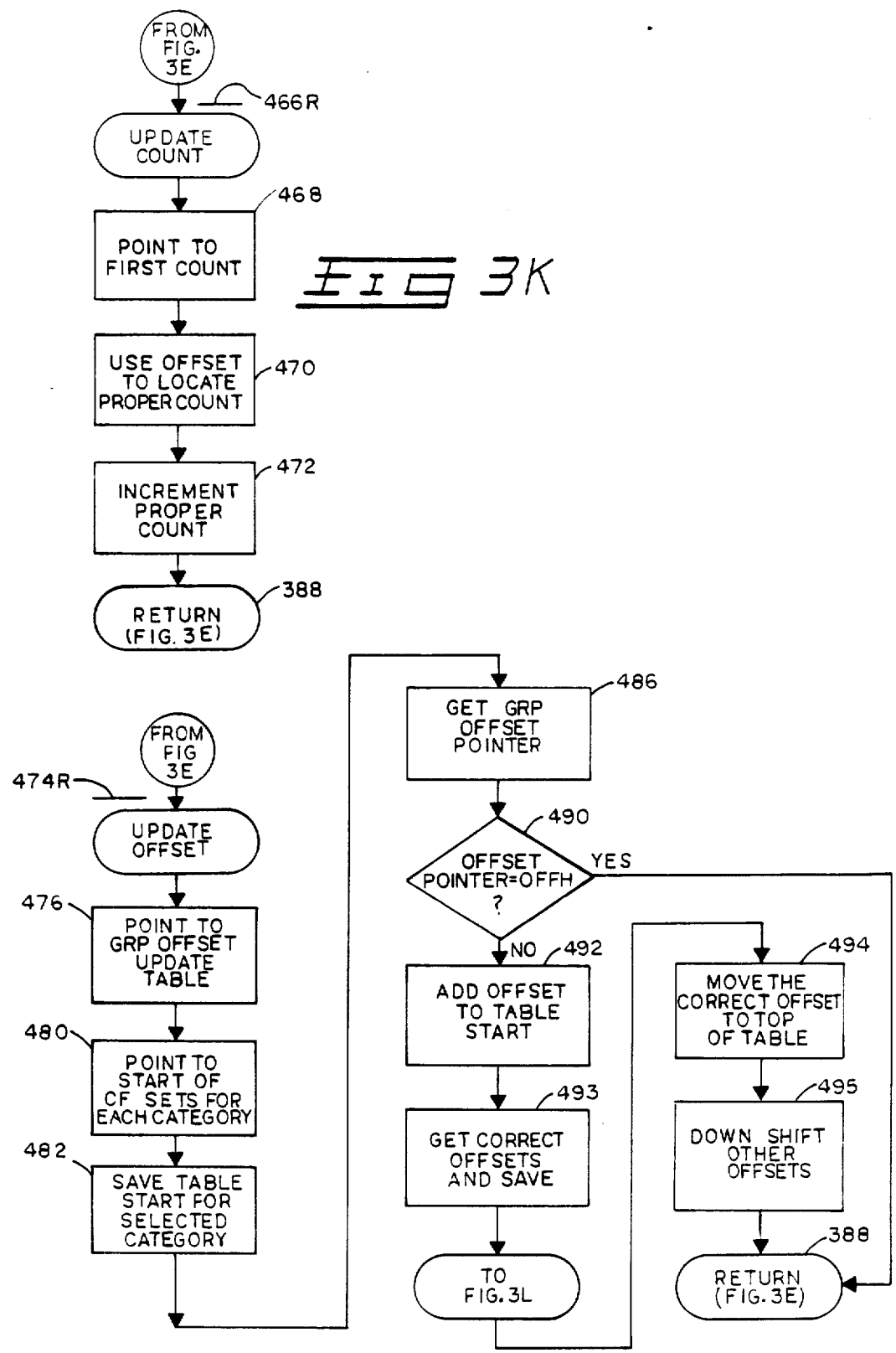

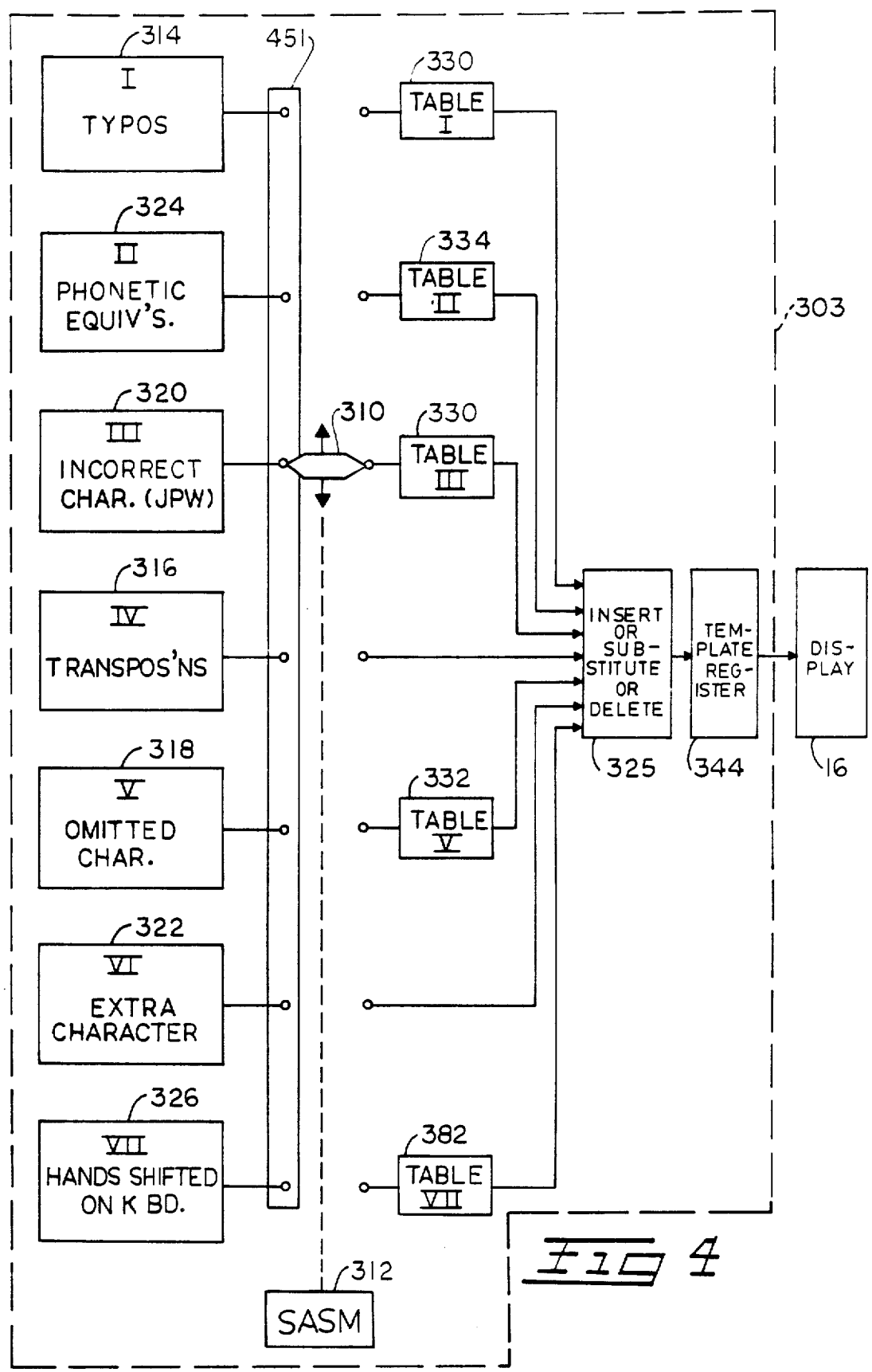

WORD PROCESSOR HAVING SPELLING CORRECTOR ADAPTIVE TO OPERATOR ERROR EXPERIENCE

RELATED APPLICATIONS

The present invention is an improvement on the "dictionary" typewriter disclosed in application Nos. 813,342 and 813,351 entitled "COMPACT SPELLING-CHECK DICTIONARY", now U.S. Pat. No. 4,782,464, and "SPELLING-CHECK DICTIONARY WITH EARLY ERROR SIGNAL", respectively; both filed Dec. 26, 1985 by the same inventors and assigned to the same assignee. It is also an improvement on the "dictionary" typewriter disclosed in application No. 869,777 entitled "DICTIONARY MEMORY WITH VISUAL SCANNING FROM A SELECTABLE STARTING POINT" and filed June 2, 1986 by the same inventors with the same assignee. Material in the above applications relevant to the present invention is hereby incorporated by reference.

FIELD OF THE INVENTION

The invention relates to word processors (or "memory" typewriters as they are sometimes called), which normally incorporate the capability of correcting any erroneous words in a last-entered group of words, such as a line, paragraph, etc. More particularly, it relates to those of the "dictionary" type—i.e., those storing lists of commonly-encountered words to which reference can be made for controlling accuracy of spelling of words entered by the typist.

BACKGROUND

Correcting typewriters have long been known which could remove incorrect characters and allow entry of correct ones by following an appropriate, but lengthy, sequence of keystrokes. With the advent of recording typewriters (paper tape, magnetic tape, magnetic card, etc.) it became possible to reduce the number of keystrokes required, but insertion of additional characters was still a cumbersome procedure, generally prohibitively expensive in terms of time (patching paper tapes, transferring the "good" portion of an error-containing magnetic record to a new record, then skipping defective material, inserting the correct material and resuming recording of "good" material from the original record, etc.).

"Dictionary" typewriters (e.g. machines incorporating the structures of References I) have recently appeared on the market which contain an electronic memory for one or more pages of entered text stored in a random access section of the memory, together with a listing of a large number of commonly-used words—35,000, say—plus about 300 special words chosen by the typist because of their frequent use, all of these words being stored in a read-only section of the memory; and a comparison unit monitoring successive text entries and emitting a visual or auditory signal when comparison of an entered word with the listing of words in memory (the "dictionary") indicates a disagreement in the spelling of the entered word. That signal indicates that the typist's entry is erroneous and the spelling of the last-entered word should be checked in a printed dictionary. In more powerful versions where the typewriter has an associated display unit, the signal may visually indicate the incorrect word and a marker may be located at the site of the error in the incorrect word.

Dictionary equipment of the foregoing kind is also known which provides the further ability to display one-by-one a succession of correctly spelled words based on a sequence of initial characters entered by the typist (one such corrective procedure is that incorporated in the Smith Corona XD 7000 and the Smith Corona PWP 12, a dictionary typewriter and a word processing system, respectively; both manufactured by the present assignee and the dictionary/listing structure essentially corresponding to that disclosed in the applications cited initially). The typist's acceptance of one of the displayed words then results in printing of that desired word with erasure of the incorrect word (and subsequent characters or words, if any) previously printed on the record sheet (accompanied by reprinting of any subsequent characters or words also erased).

While the foregoing improvements have done much to enhance the quality of communications prepared by poor spellers, the efficiency of typewriter use is still not optimum because time spent looking up the correct spelling of a word in a printed dictionary or scanning a list of valid words successively presented in alphabetic order on a display would be more productively spent as further typing. Thus, there is need for reducing correction of errors to a simple, fully automatic operation, preferably by depression of just one key and by selection of a first-applied correction information in accordance with the kinds of errors the typist is most likely to commit, not only initially but also as experience is gained.

SUMMARY OF THE INVENTION

The invention provides for a word-processing system of the kind having operator input through a keyboard with a plurality of depressible keys, a spelling dictionary stored within the system, and an error-signaling device activated upon entry of an incorrect word as compared with the dictionary; together with a special key included in the keyboard input, a storage unit holding correction information of at least two classes, a device for selecting a desired one of the at least two classes of correction information, and an amending unit operable to apply the selected one class of correction information to the incorrect word to produce a first trial word therefrom, the amending unit being responsive to depression of the special key subsequent to activation of the error-signaling device.

According to a further feature of the invention, the correction information held in the storage unit of the word processing system may encompass two or more of the following seven classes: (I) typographical correction, (II) phonetic substitutions, (III) changing of characters that are simply incorrect, (IV) transposition reversal, (V) insertion of omitted characters, (VI) deletion of extra characters, and (VII) amending of input garbled by inadvertent shift of the operator's hands relative to the keyboard during input.

According to another feature of the invention, the selecting device is statistical in nature, controlling selection of one of at least two classes of information depending upon the relative extent of the operator's prior successful usage of each class.

Accordingly, it is an object of the invention to provide an improved dictionary typewriter or word processing system having a program with fast, efficient correction of misspelled or mis-typed words on a display or printed record.

It is a further object of the invention to correct errors of the above-mentioned kind by use of program controls which make an intelligent decision (i.e., one based on experience with the user's weaknesses) as to the actual word which the operator meant to enter at the keyboard.

Other objects and features of the invention will become evident from a reading of the ensuing description taken in conjunction with the drawing.

BRIEF DESCRIPTION OF THE DRAWING

FIG. 1 shows a block diagram of a word-processing system or dictionary typewriter having automatic word correction based on the most probable class of error, according to the invention.

FIG. 1A lists various ones of the elements comprised in the block "Auto-Spell Buffers, Pointers and Counters" which forms part of External RAM in FIG. 1 according to the invention.

FIG. 1B lists individual flags relevant to the Auto-Spell TM program, these flags being shown as a block in the Status Register of the Microcomputer in FIG. 1.

FIG. 2 is a schematic diagram showing dictionary tables useful in connection with the dictionary typewriter of FIG. 1 and comprised in the word storage section of a memory holding a list of 30,000–50,000 valid words (which may include about 300 special words from the user's lexicon) available for comparison with each word entered through the keyboard of the dictionary typewriter of FIG. 1, together with indication of error upon entry of an improperly spelled word.

FIGS. 3A to 3L are sections of a simplified flow chart showing major steps in the program for automatically checking several categories of errors, as provided in the typewriter of FIG. 1.

FIG. 3A shows the routine covering preliminary activities occurring at the start of the Auto-Spell TM program according to the invention.

FIG. 3B shows the Spell-Monitor routine which activates upon depression of any key on the keyboard and determines whether that key is the Auto-Spell Key or any of the other keys of significance in the Auto-Spell program.

FIG. 3C shows the "Mainline" routine of the Auto-Spell program, which routine determines whether alternative words have been developed, whether one of these is available for display, whether checking for single errors is complete, and the like.

FIG. 3D shows a side loop in the Mainline routine of FIG. 3C, this loop checking for possible presence of combinations of phonetic errors, and developing appropriate alternative words where possible.

FIG. 3E shows a subroutine continuation of the Spell-Monitor routine (FIG. 3B) when the typist indicates by depression of a designated key that an acceptable alternative word has been developed using information and techniques appropriate to a selected error category. The subroutine updates statistical values relating to the number of successful corrections performed previously by using that error category.

FIG. 3F shows a subroutine for successive selection of each error category and updating of its corresponding statistical values in implementation of the routine of FIG. 3E.

FIG. 3G shows a subroutine forming part of FIG. 3F and detailing the steps by which the statistical values are updated.

FIG. 3H shows a subroutine for selecting the proper check routine—that is, the corrective routine with the highest frequency of use.

FIG. 3I shows a subroutine for determining any changes in the order of category selection when use of the most-likely error category does not produce a match between a trial word and any of the words in the Spelling Dictionary of FIG. 1.

FIG. 3J shows a subroutine for identifying the most-likely error category for use in developing alternative words. This subroutine is called in the subroutines of FIGS. 3F and 3I.

FIG. 3K shows a subroutine for increasing the count corresponding to a given category upon successfully using corrective information from that category by forming an accepted alternative word.

FIG. 3L is another side loop (associated in this case with the subroutine of FIG. 3F) which depicts steps in a "second level" reordering of groups in a given category.

FIG. 4 is a block diagram showing the seven categories of spelling errors checked when errors are signaled by the dictionary typewriter (or system) of FIG. 1, together with a Selected-alternative Statistical Memory (SASM) controlling a "Selection Register" establishing the order in which the above-mentioned categories are checked so as to maximize the probability of displaying the word actually intended by the typist after making only one pass through the control program, and then printing the displayed word upon its acceptance by the typist as the intended word.

FIG. 6 is a block diagram showing the arrangement of statistical information, both original and derived, which is used for applying corrective information to an erroneous word.

DESCRIPTION OF THE PREFERRED EMBODIMENT

Figure 3B:
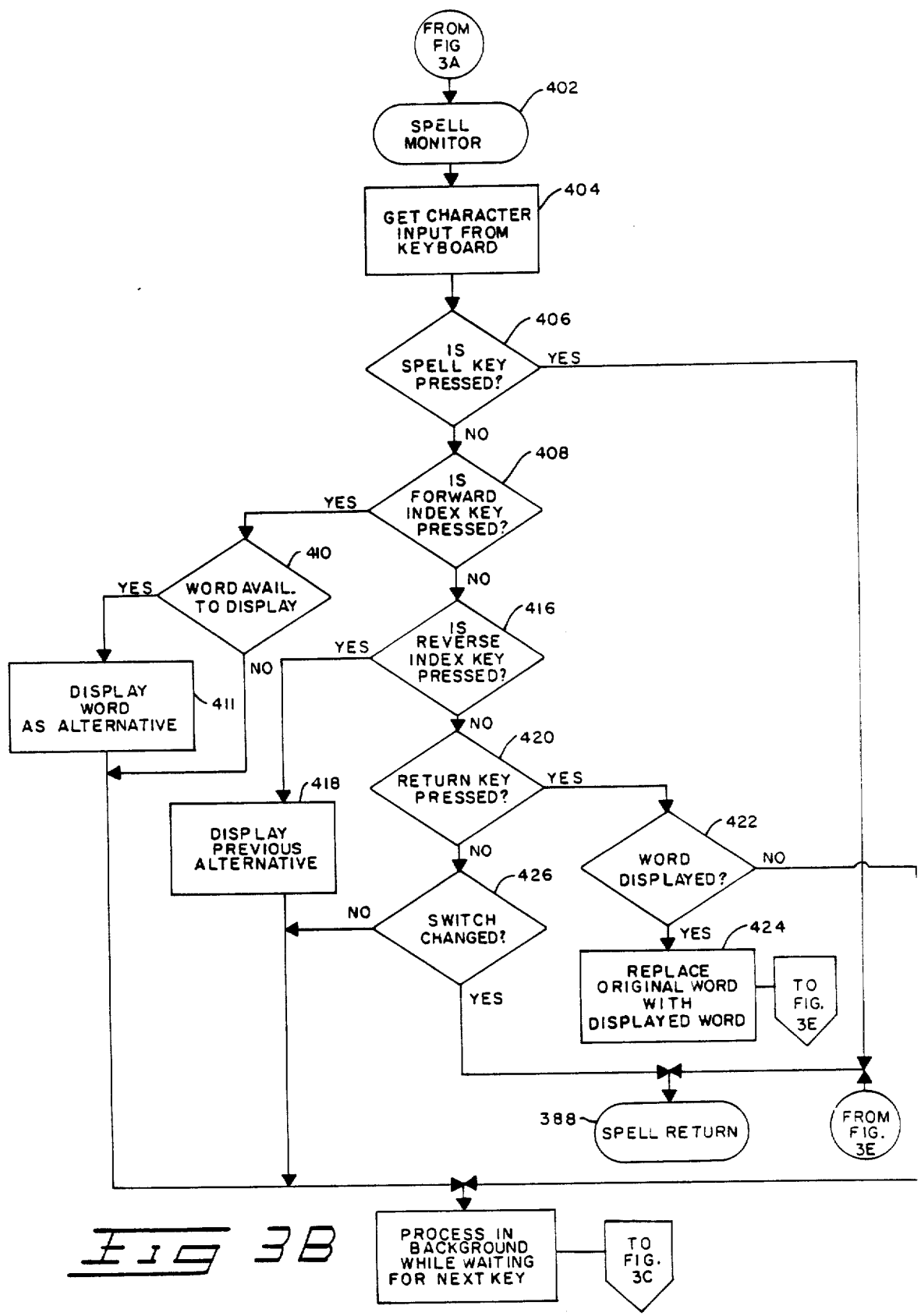

The invention will now be described as embodied in an interactive word information processing system 8 storing a dictionary in its memory unit, such as that disclosed in our previously identified co-pending applications (the first two of these having practically identical specifications and therefore being termed "References I" hereinafter for simplicity while the third will be termed "Reference II"), shown in block diagram form in FIG. 1. That figure is essentially similar to the identically-numbered figures in each of References I. It may be noted that reference numerals are the same for like elements in all three figures but—as a rule—where they have been modified for purposes of the present invention, the reference numerals are three digits long and begin with the number 300. Other changes for economy or improved efficiency made in a known fashion and in areas not relevant to the present invention may be mentioned, but only briefly, in order to reduce possible confusion when comparing the figures. The word information system 8 of FIG. 1 has four principal units comprising a keyboard 10, an electronic control circuit 12 (encircled by dashed lines), a printer unit 14 and a sub-system 300 (an adjunct bounded by dot-dash lines at the bottom of FIG. 1) controlling an "Auto-Spell" ™ correction sequence.

According to the present invention, "Auto-Spell" ™ Control 300 (as it will be termed hereinafter for simplicity) in conjunction with the Dictionary list 56 described in References I provides a one-key word corrector that permits replacement of a misspelled or mistyped word with the actually desired word (or at least the most likely one) that the typist had in mind when the erroneous version was entered. This replacement occurs in response to a minimal number of strokes on a keyboard 10 by the typist. Toward these ends, the number and types of mistakes the particular typist is prone to make are recorded, and this information then utilized to modify the system control sequence so as to choose first the corrective procedure corresponding to the most likely error when the typist subsequently misspells or mistypes another word. This feature is implemented by what may be termed an "Intelligent Replacement Algorithm".

When a word is misspelled or mistyped, the keyboard operator (typist) is notified of this by a warble signal characteristic of such an error, as disclosed in References I. Pressing a Special Key 302 termed "Auto-Spell" ™ upon reaching the end of the word (established by use of a Space Key 20S or other punctuation key, as also disclosed in References I) causes an alternative or "trial" word—which must be one existing in Dictionary 56—to appear in display 16. If that trial word is not the desired one, then the typist may press an Index key 20I and each time this is done, another alternative word replaces that currently presented in Display 16. Pressing the Reverse Index Key 20RIN causes the previously displayed trial word to be presented again.

Once the typist recognizes (or wishes to choose) a displayed trial word, the typist simply presses the usual Return key 20R and the erroneous word previously part of the text visible in Display 16 and on Document 15a (ordinarily a sheet of paper 15a, as termed hereinafter) is replaced with the desired word correctly spelled.

Lastly, if the typist does not wish to make any change, preferring the original spelling after viewing the alternative words, Auto-Spell Key 302 can be depressed a second time and the original word is not replaced, being returned to Display 16 and being retained in the text on Sheet 15a, if printed.

Alternative words for replacing the incorrect word are developed by checking the latter (placed in a special Register 344 termed the Compare Register hereinafter) for the following categories of errors (the order of presentation not being inflexible, as will be seen):

| CLASS | DESCRIPTION |
|---|---|
| I | Common typographical errors (Box 314) |
| II | Phonetic substitutions (Box 324) |
| III | Characters that are simply incorrect (Box 322) |
| IV | Transpositions (Box 316) |
| V | Omitted characters (Box 318) |
| VI | Extra characters (Box 320) |
| VII | Hand(s) shifted left or right on keyboard (Box 326) |

Actual lists of the typographical errors and the phonetic substitutions of Classes I and II are shown in Appendices A and B, respectively. The order in which the alternatives I-VII shown above are chosen will vary depending on the kind of errors the typist has made most often previously while using the typewriter (or "system") 8, according to the invention.

Spelling checks are performed from left to right on the erroneous word and in accordance with the error categories listed above. Any single error in a word should be found as long as the error falls into one of the above categories. There is one exception in that the first character position of a word is checked only when involved in Classes II, IV and VII—namely, phonetic substitutions, transpositions, and keyboard hand shifts.

As will become evident, multiple errors are not checked except for Class II, phonetic substitutions. There, the best alternatives (those which most closely resemble correctly spelled words) obtained while checking for single phonetic errors are ranked and, if none of these provide a match, then a second round of phonetic substitutions is attempted at appropriate secondary locations in these alternatives sequentially according to the ranking established.

At this point, it may be remarked that System 8 normally operates in one of three modes: Typewriter Mode, Line Mode and Memory Mode. In the first of these modes, system 8 behaves like a normal typewriter, characters being printed on Sheet 15a as they are entered on Keyboard 10. Pressing of A-S (Auto-Spell) Key 302 enters the most likely alternative on Display 16, with further alternatives being displayed upon pressing Index key 20I thereafter. When the correct word is seen on Display 16, the typist can press Return key 20R and trigger Printer 14 to replace the invalid word on Sheet 15a with the correct word from Display 16. In Line Mode or Memory Mode, the special Key 302 and Index Key 20I function in the same manner as in Typewriter Mode except for printing, since corresponding text does not appear on Sheet 15a until Return Key 20R or the like has been pressed. The original word is merely deleted from memory and the replacement word automatically inserted in its place in Display 16 and the Correction Buffer 54 of FIG. 1 (e.g., right shifting all subsequent data in memory being made, if necessary, to allow for extra characters when present in the corrective information), both in known fashion. In the Intelligent Replacement Algorithm according to the invention herein, the Auto-Spell control 300 is such that the kinds of mistakes which the typist is most likely to make are "learned" by noting the category from which the typist selects the "trial" word after depressing A-S Key 302 and incrementing the count in a Register 508 associated with that category. A simple weighting technique is used to bias the different error categories I to VII (FIGS. 3 and 4). Each time an error is made and the typist selects an alternative word generated by applying corrective information in a given category, then the corresponding count is incremented and a weighting figure associated with the count for that category is adjusted. Note that the weighting figure is adjusted downward if the corrective information in a given category does not yield a valid alternative, as explained subsequently. The order in which Control 300 chooses categories for the first generation of an alternative upon occurrence of a further error thereafter is determined according to the category with the highest corresponding weight, followed by those with successively lower weights, until that with the lowest weight is attained. This "learning", as it is most simply termed, gives Control 300 the "intelligence" to select the most likely category for display first, the number of key depressions required being minimized in keeping with the primary goal of the invention.

The above-mentioned weighting statistics are stored in a "selected-alternative statistical memory" 312 (or SASM 312 as it will be termed hereinafter for brevity) forming a portion of RAM Memory 254 (or 24E, as may be preferable). So that long term accuracy may be assured, SASM 312 is battery-backed, as shown in FIG. 1 by the symbol for an associated Battery 342. SASM 312 is cleared or reset by powering-up System 8 while the Special Key 302 is pressed or by breaking the connection of Battery 342 to RAM 254 by, say, momentarily opening switch 343 in FIG. 1.

It may be mentioned at this point that—as explained in greater detail subsequently—for certain categories of errors, including typographical errors, omitted characters, characters that are simply incorrect, and phonetic substitutions, the sub-elements within these categories also rise in priority as they are accepted as replacements. For instance, if a typist omits a "k" from a word and the replacement word containing the "k" is accepted as proper, the letter "k" will be part of the first batch of characters inserted (one at a time of course) the next time possibility of omissions is checked. Therefore, it is clear that in some cases there are actually two levels of learning: the category itself and the sub-elements thereof, the presence of the two levels increasing the probability of automatically choosing the proper alternative first.

Before beginning a detailed description, a short overview of the entire system will be given (more complete details of the Dictionary section 56 may be found in References I). Keyboard 10 includes a normal set of symbol keys 18 and typewriter function keys 20, the former relating to printable characters, numbers and punctuation marks, etc.; and the latter relating to format control or other special function commands in the system. A two-position switch 22 selectively enables and disables operation of keyboard 10. Some function keys 20 labeled in FIG. 1 include: carrier return (R), backspace (BS), index (IN), Reverse Index (RIN), tab (TAB), pitch (PITCH), correct (CR), and space (SPACE). A "code" function key 21 (always operated in conjunction with one of the keys 18 or 20) serves to select an operative mode of the system, such as the "dictionary" mode previously disclosed, whereas—according to the invention described below—"Auto-Spell" TM key 302 is present to permit initiating an automatic correction sequence governed by the Control 300. Assuming switch 22 is in the ON position, depression of any one of the various keys 18, 20, etc. on keyboard 10 operates a switch matrix (not shown, but known) scanned periodically by electronic circuit 12 in a known manner to generate a keyboard output signal uniquely related to the depressed one of the keys e.g. 18,20,21, or 302. The three principal units 10, 12 and 14 of FIG. 1 interact in the usual fashion, manual selection of any desired typewriter operation being made at keyboard 10. Printer unit 14 is operated—in turn—under control of electronic circuit 12 for accomplishing the function selected by a keyboard input—such as, for example, printing a character corresponding to a selected character key 18 or corresponding to one or more correction characters supplied by "Auto-Spell" TM, the automatic correction sequence governed by Control 300. Though preferably embodied in an electronic typewriter, the units 10, 12, 14 and 300 alternatively may comprise individual components combined in a manner common to many word processing systems.

Just as in Reference I, system operation is controlled here through a microprocessor 24 (a known electronic component located within the electronic control circuit 12) connected to keyboard 10 by bus lines 26. Master microprocessor 24 typically has output ports 28, input ports 30 and various electronic control elements including a number of storage registers 24E. One example (others being identified subsequently) is a Current Character Position register 32 which keeps track of the current character position in relation to a previous reference position along a type line 15 of Printer 14 (a daisy-type impact printer for purposes of this description, although other types would be equally suitable) as the character information is printed on a sheet of paper 15a. Some operative elements in the master Microprocessor 24 include (A) TIMER, (B) COUNTER, (C) INTERRUPT, and (D) STATUS RAM (a "Random Access Memory"). TIMER 24A is a conventional unit providing predetermined time delays required in the system. COUNTER 24B functions to continually update the system's operation during interruption in the system. INTERRUPT 24C initiates a periodic scan of keyboard 10 to determine whether a new key selection has been made. STATUS RAM 24D provides temporary storage of current keyboard information for reference and recall purposes as will be seen. In addition, STATUS RAM 24D provides for a plurality of FLAGS (single-bit, two-state memory units, the current state of which is periodically interrogated as part of the machine's program routine, the program path varying in accordance with the state determined). These include a "Dictionary" flag 38, a "Huffman Code" flag 41 and an Auto-Spell flag 306, according to the invention. Only flags relevant to that invention are discussed herein though other known flags may also be present. RAM 24D also includes a byte 39 which functions as a Character Counter (software), being incremented by unity as each character of a word is entered.

Master microprocessor 24 communicates with keyboard 10 through INTERRUPT 24C for scanning keyboard 10 at intervals of several milliseconds (under control of TIMER 24A) to detect any key depressions. Detection of such causes a unique set of signals representative of the selected key (18,20,21 or 302) to be issued on lines 42 to a Buffer Chip 44.

Buffer Chip 44 (a known "I/O Expander" multi-purpose LSI chip), transfers the signal set to a FIFO storage section 48 where they are temporarily held until completion of processing a previous keyboard input. Each set is then fetched in the order of input, under program control (see below) for decoding in known fashion to provide a daisy position code signal on a bus line 50 when the signal set held in FIFO section 48 originates from depressing a printable symbol key 18. Non-printable special function signals arising from depressing keys 20 (or keys 18,20 in combination with the code key 21) are also decoded in known fashion, but into Printer Format or other control data for subsequent processing.

As seen in FIG. 1, the printer code signals from FIFO section 48 appear on a bi-directional bus line 50 connected to a ROM 52 (Read-Only Memory), a RAM 254 (a unit separate from Buffer 44 as herein disclosed because of a need for capacity greater than that available in the RAM unit 54 of References I) and to input ports 30 of master microprocessor 24. In the instance of printable symbol key depression, the printer code signals are sent to RAM 254 for storage. ROM 42 includes not only the Program Control section 40 and Dictionary section 56 disclosed in References I, but also includes a Correction Element Storage section 304, according to the present invention. Moreover, Program Control section 40 of ROM 52 contains not only the main program 40a, with necessary instructions to operate master microprocessor 24 in a prescribed manner (e.g one similar to those known for control of "daisy-wheel" typewriters), together with a secondary set 40b of program instructions for a Spelling Check type of operation but also—according to the present invention—a tertiary set 303 of program instructions for the automatic correction sequence operation, as will be described. Dictionary section 56 of ROM 52 contains a multiplicity of addressable codes assembled to form words of a word list used to verify the spelling order of characters upon release of printer decode signals from RAM area 54 of RAM 252 as described briefly below. That RAM area 54 is identical to RAM 54 of References I and primarily functions as a correction buffer for keeping track of the last plurality of printable character inputs for orderly recall but is also used for purposes of the present invention, as will be described. Character inputs are stored in RAM area 54 (part of Input Buffer Chip 44 in References I, but here part of RAM 254 as mentioned earlier), in the form in which they are processed for printing and/or display under control of master microprocessor 24, this storage area 54 retaining all characters entered into a line such that they are available for purposes of correcting the text on paper 15a until pressing of Return key 20R starts a new line of printed entries. Area 54 will therefore be referred to hereinafter as "Correction Buffer" 54.

A brief general description relating to the basic operation of character input monitored by a spelling check as in the word information processing system of FIG. 1, will now be given. Operator depression of a keyboard key (18,20,21) is detected in the previously-mentioned matrix scan initiated by INTERRUPT 24C. A unique signal set representative of the selected key is then sent to FIFO section 48 and stored until decoded by Microprocessor 24 as is known. If determined that the selected key is one of the printable character symbol keys 18, flag 38 is set, or it is one of the function keys 20 (as possibly modified by simultaneous depression with CODE key 21) another flag such as Dictionary Flag 33 may be set. Each key input is released on a first in-first out basis in response to processing of all preceding key inputs, as stated earlier, and again appears on bus line 50. There it is applied essentially simultaneously to ROM 52 and RAM 254 by master microprocessor 24. In ROM 52, Program Control 40 is interrogated or read for appropriately operating master microprocessor 24 according to desired program routines in known fashion. The decoded signal from line 50 is also applied to Dictionary section 56 for a spelling check in the manner described in detail in References I and briefly reviewed herein. It should be remembered, though, that the decoded signal sequentially stored in RAM area 54 is in the form of Daisy Position or Printer Format Codes too unwieldy for spelling check purposes, hence the necessary further code conversion is readily performed in known fashion by using the printer codes as arguments in a look-up table 46, likewise stored in ROM 52. The preferred code output from table 46 is a simple 5-bit binary expression of the alphabetic order from 1 to 26 for A to Z. In most cases, upon entry of successive characters of a word by use of keyboard 10, Master microprocessor 24 under direction of main Program Control 40a operates slave microprocessor 60 for ultimately processing each selected key function at Printer 14 without incident into a corresponding succession of imprints on Sheet 15a. Should the typist strike a wrong key, however, the system will detect this and emit a warbling signal through Alarm Device ("beeper") 19 of FIG. 1 to alert the typist.

The dictionary storage apparatus of References I is used with the Auto-Spell Control 300 according to the teachings of the present invention and described in detail below in view of FIGS. 2–6. In FIG. 2, the four major storage areas comprised in Dictionary section 56 are shown. Dictionary section 56 contains a multiplicity of character address codes relating to particular characters and arranged to provide an alphabetical listing of words. The words are stored using three look-up tables 78–82 (where each character is generally present in the five-bit binary code previously mentioned) and a character tree structure 84 (where each character is generally present in a compressed or "Huffman" code). The three look-up tables 78–82 are connected in series to verify the spelling order of the first three character inputs. The tree structure 84 extends from the third table 82 and provides the information for verifying the spelling order of characters beyond the third character of the longer words.

Each one of the three Dictionary tables 78–82 has a multitude of addressable memory locations and each memory location contains a unique output address or "pointer" that relates to a particular character in conjunction with the previous characters of the word. The first Dictionary table 78 has addresses relating to first character input (first one after a space—or equivalent punctuation mark separating successive words) and thereby establishes the identity of the character beginning the spelling of a word. The second table 80 has addresses arranged in groups to confirm the spelling order of the second character input in conjunction with the first entered character. Similarly, the third Dictionary table 82 has addresses arranged in further groups to verify the spelling order of the first three character inputs. As will be recalled, the order of entry of the characters of a given word upon sequential depression of the desired keys 18 is tracked in the one-byte software counter 39 in Status Ram 24D, the value in the byte being incremented by unity as each entry occurs. Tree structure 84 on the oher hand, has branches 85 individually comprising a string of character memory locations 108 corresponding to additional characters in one or more words having the same three-character root. Each branch 85 is therefore chosen by one address location in the third table 82 for checking the spelling order of the fourth and all subsequent character inputs.

As explained in greater detail in References I, the above-mentioned entry of an incorrect character in the succession of characters forming a desired word but failing to match any characters at that location in the prior art of the words in the listing stored in section 56, therefore leads to production of a signal on the "End-of-Table" output 96 in the Tables 80,82 or on the "Stop" output 116 signifying the end of a given one of the branches 85-n in extension Table 84. These signals then result in the setting of "Spelling Error" flag 36 and early emission of the warbling output from Device 19 of FIG. 1 to alert the typist. In order to decide the correct spelling, the typist must then call up a display of successive words listed in alphabetical order which share the same initial characters up to the incorrect character.

Such a corrective procedure is that disclosed in Reference II which is initiated by simultaneous depression of Code key 21 and the "L" key 18L and brings out to printer 14 (or preferably to display 16, if present), the entered characters of a word—exclusive of the erroneous one and any which follow thereafter—together with succeeding characters in the first word of Dictionary listing 56 which shares the correct ones (i.e., non-excluded ones) of the entered characters. If that first word is not appropriate, a further succession of words having the like-positioned correct characters in common and being present among the alphabetically-ordered words of the listing, may be called by the operator's repeated depression of Index key 20I and subsequently reviewed, if desired, by pressing Reverse Index key 20RIN. Note that the listing begins with the shared characters of the word followed by the earliest letter of the alphabet appearing in a valid word (that is, one contained in dictionary storage section 56 shown in FIG. 1) at a position corresponding to the erroneous entry.

As evident from the foregoing, the chance of displaying the desired word on the first pass using the approach referred to just above is statistically slight because of the many possible sources of error attributable to ineptness of beginning typists and carelessness of some so-called "fast" typists.

Contrastingly, according to the present invention, when the operator has been alerted of an error, the error signal is ignored momentarily, the erroneous word being completed in the form which the operator believes most accurate. Following this, A-S key (as termed hereinafter) 302 alone is depressed to bring about display of a properly spelled word which is most probably the one the operator had in mind. The word displayed is obtained by applying statistically-selected corrective information successively to the erroneous word and testing each amended word (or "trial" word as it may be termed) until a match is obtained with a valid word stored in Dictionary Section 56. Selection of the particular corrective information is performed under control of SASM 312, and that information applied as governed by the automatic correction sequence of Control 300, the matching word (if such exists in list 56) then being presented on Display 16, as will now be described.

Having given an overall view, one may now turn to FIGS. 3A-3L and FIGS. 4-6 which illustrate detailed techniques for applying corrective information according to the invention. To begin with, as seen in FIG. 3A (the first of a series of simplified flow charts relevant to the present invention), pressing A-S Key 302 initializes all corrector elements—i.e., flags, pointers, and counters—the flags being cleared, the various pointers and counters set to a "ONE" or other appropriate value. At the same depression of Key 302, the erroneous word just entered at keyboard 118 (the word being defined by all characters entered between the just-typed space and the next-most recent space—the term "space" here generally representing a blank or any other punctuation indicative of the start or end of a discrete word) is transferred from Display 16 to Template Register 344 (FIG. 1). The just-entered or "original" word containing the error is stored in Template Register 344 for performing the correction sequences, and also sent to Correction Buffer 54 so that word is still available should the typist wish to retain it in the text after viewing the alternatives. Display 16 is then cleared of prior text in preparation for presenting the first corrected valid word (that is, the original word transformed—in the manner to be described—according to a routine and the related correction information both chosen by SASM 312 via a Selection Register 310—see FIG. 14—and displayed, if found to exist in Dictionary 56 as so transformed). The selected routine uses an appropriate one of the Insertion/Substitution/Deletion Controls 325 in known fashion to amend the incorrect word in Template Register 344 for purposes of the comparison with words in Dictionary 56.

Before describing SASM 312 and its control of selection of the categories of Classes I-VII by Selection Register 310, a brief discussion of each category is deemed appropriate. For this purpose the arbitrary numerical order of these classes (I-VII) will be followed for ease of presentation and recall. It should be kept in mind that this arrangement is purely convenient, SASM 312 possibly "placing" them in any order—e.g., Class VII selected first and Class I last—because of the particular typist's individual weaknesses.

For checking typographical errors of Class I (Box 314 in FIG. 3 or 4), the process is a simple routine in which successive positions in the incorrect word stored in Template Register 344 are first checked for presence of one of the characters in Table 330 which should be replaced with the associated substitute from the list of Appendix A (e.g., "M" in the first group of Appendix A to be replaced by "N", "R" by "T", "T" by "R", etc.), generally beginning with the highest in the alphabetic hierarchy if more than one substitute is available (e.g., in "E" in the fourth group of Appendix A being replaced successively first by "A", then by "S", and last by "T" should each replacement in its turn fail to produce a valid word).

Figure 5:
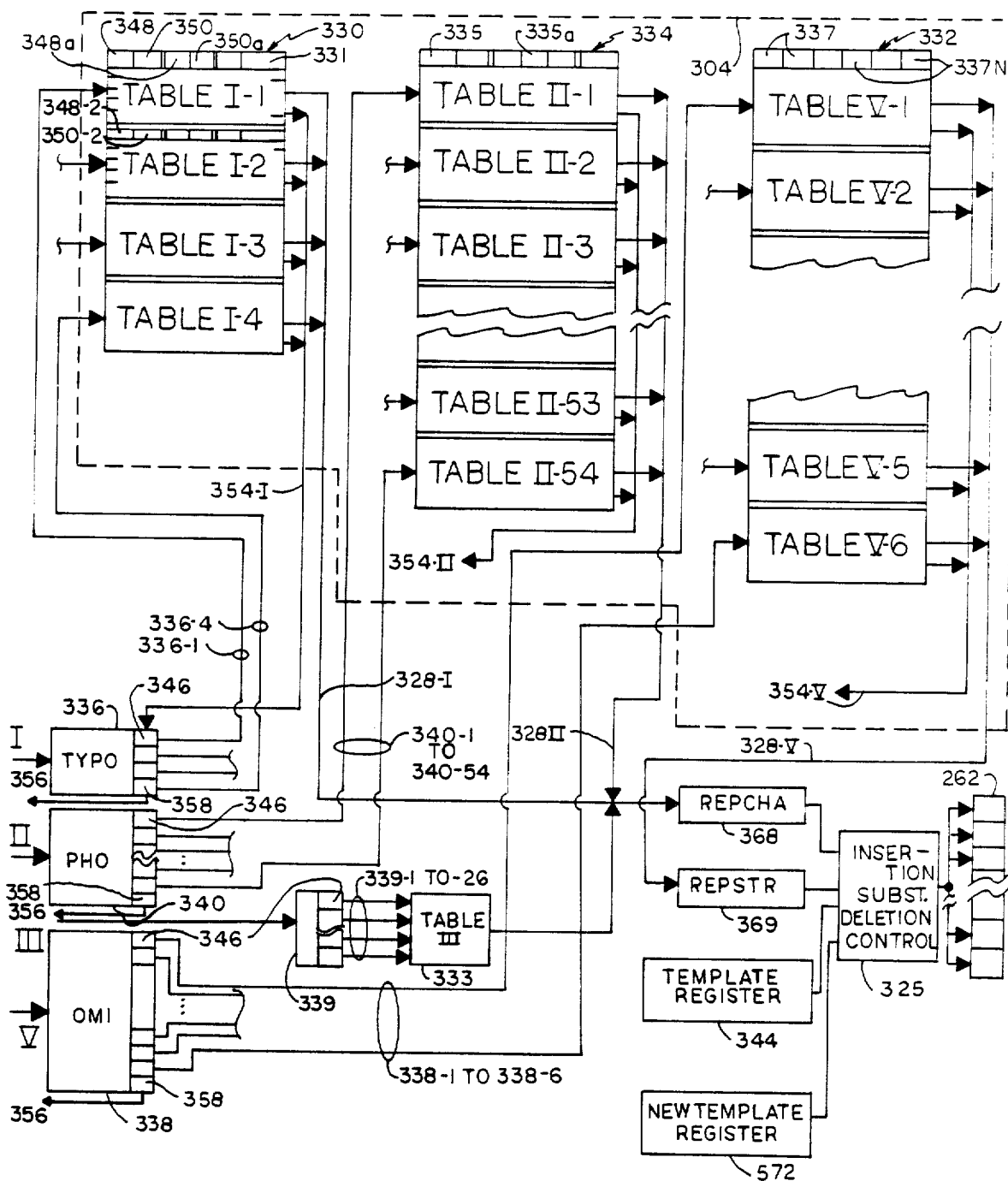
FIG. 5 is a block diagram showing the tabular arrangement for choosing particular word elements leading to correction of an erroneous word on the basis of statistically-controlled selection of any one of four distinct multi-element categories of the seven from FIG. 4.

When SASM 312 selects checking of the erroneous word in Template Register 344 for presence of specific typographical error, the routine of Box 314 first points to the Offset Table 336 (FIG. 5) and begins at the top of Typographical Error Table 330 by virtue of the Offset 336-1 (actually an address transferred into the usual data pointer in Microprocessor 24—e.g., DPTR 258 of Reference II, as seen in FIG. 1—but being shown in FIG. 5 as a line, conforming to the practice adopted with respect to References I). The Offset 336-1 stored in Offset Table 336 designates the beginning of Table I. Note that Table I (330 in FIG. 5) is subdivided into four portions 330-1 to 330-4, each containing a distinct group of typographically equivalent character pairs (the group in the first portion 330-1 not necessarily being sat the beginning of Table I, as described subsequently). The above-mentioned offset may thus be possibly modified if all substitute characters of portion 330-1 in Table I have already been checked, in which case the base address desired is that for the portions 330-2 to 330-4. The additional offset is addressed according to the value in a Counter 346, that value being zero as initialized, and being incremented at the end of each portion of Table 330—a signal 354 being issued in fashion similar (but not identical) to that for EOT signal 116 from Dictionary tables 80,82 in FIG. 2, a new offset value rather than an error signal being provided as the result.

Each of the portions 330-1 to 330-4 is laid out in fashion similar to that for Tables 80,82 of FIG. 2—namely, each is in the form of the well-known "look-up" tables in which an argument byte is associated with one or more data bytes, these last being normally accessible in alphabetic succession.

Table 330 (the first in FIG. 4) comprises a number of paired data storage locations 331 each containing a particular input character associated with a replacement character for correcting that input character when potentially in typographical error. Each paired data storage location 331 in a particular portion 330-n holds an eight-bit "argument" byte 348 containing a character code and at least one other eight-bit "data" byte 350 storing a unique replacement code identifying a particular typographically equivalent character to be substituted for the current potentially erroneous character. The exact number of data storage locations 331 provided in each group 330-n varies according to the frequency of occurrence of the typographical errors, the group content being based upon long known published studies.

Assuming portion 330-1 has not been checked, the first argument 348 (a five-bit code representative of a particular erroneous entry) is then compared in known fashion with the five-bit code of the first character of the erroneous word previously stored in Template Register 344. That first character is addressed by the Character Counter 39 of FIG. 1 inasmuch as completion of the erroneous word by pressing Space Key 20S ended in resetting Counter 39 to its initial count of "ONE", as disclosed in References I. If comparison of the five-bit codes shows identity, then the first replacement character (stored in the next byte 350, attained by incrementing the previously mentioned data pointer DPTR 258) is transferred to the Replacement Character Register 368 where it is held for subsequent use, the initial use being a transfer to the first (designated) character position of Template Register 344. The "trial" word thus formed is sought in the successive words of Dictionary 56 generally in the manner disclosed in References I (its existence established by a space or other punctuation at the end of the trial word coinciding with the presence of a Word Terminator 112 in Dictionary List 56 after the last matching character). If the "trial" word is found to exist in List 56, the Display Word Flag 412 is set and as a consequence the "trial word" is transferred from Register 344 for presentation in Display 16 in the fashion briefly described earlier.

Upon recognizing a word presented on Display 16 as being the word intended, the typist may then press Return Key 20R to initiate a generally known correction sequence involving transfer of the desired word to memory (Correction Buffer 54 and File Memory 576), followed by erasure of the incorrect word printed on Sheet 15a and typing of the trial word in its place (assuming system 8 in Typewriter Mode). As mentioned earlier and described subsequently, appropriate additional actions are taken automatically if one or more valid words have been printed on Sheet 15a following the erroneous word and the trial word is longer than the erroneous one.

The following data byte 350 at each location 331 in Table 330-1 is chosen depending upon whether or not the associated argument character in byte 348 of Table 330-1 matches the particular character of the incorrect word pointed to in Template Register 344. If not, the mismatch causes incrementation of Counter 39 to the count of Two (or other appropriate value) and the five-bit codes of byte 348 and the second (or other) character compared. If now successful, byte 350 replaces this second (or other) character and the amended word is again compared letter-by-letter with the word list of Dictionary 56 in a manner similar to that disclosed in References I, except that detection of the EOT signal 116 (FIG. 2) now merely indicates that the substitute is not suitable. As a result, another incrementation of Counter 39 occurs and causes selection of the character at the next position in Register 344, etc., etc. The identity test for presence of a typographical error (agreement with the argument character in byte 348) is abandoned when the value in Counter 39 equals that in Bad Character Counter 370 (the error already exists at that point) or when EOW Flag 35 is set (indicating a space or blank at the end of the incorrect word). In either case, Character Counter 39 is reset to the count of "1" and Data Pointer 258 is incremented by two units to point to the next argument byte 348a in Table 330-1. The above-described character comparison is then repeated and, if successful, the content of the associated data byte 350a is stored in Register 368, from which it is transferred to replace the corresponding character of the incorrect word as above. The newly amended word is then compared letter-by-letter with the word list of Dictionary 56. If detection of the EOT signal 116 indicates that this substitute too is not suitable, yet another incrementation of Counter 39 occurs, again causing selection of the character at the next position in Register 344 for comparison with byte 348a and, if identity is established, substitution of the byte 350a (now in Register 368) for that character, etc., etc.

After Counter 39 reaches the value in Bad Character Counter 370, an incrementation of the address in DPTR 258 occurs which leads to selection of the next year 348,350 (this may have the same character as argument as seen in Appendix A) for provision of a possible substitute upon a match with the successively desgnated characters of the erroneous word, with resultant new modification of that word at the indicated position in Register 344, and repeated comparisons performed letter-by-letter as described above. If they too fail, and no more substitutes are available in portion 330-1, as indicated by detection of an End-of-List code (00 in hexadecimal notation, equivalent to a signal issued on Address Line 354-I from portion 330-1 in FIG. 5) in the last argument byte 348n, the result is a jump to the address of the next portion 330-2 of Table I where the first argument byte 348-2 is again compared with the erroneous character (first, Counter 39 having been reset to "1") in the manner described above. If successful, the associated replacement character from byte 350-2 is substituted at the indicated character position in the current word to form a new "trial" word and a letter-by-letter search for a match with a valid word in Dictionary 56 is again performed, etc., the valid word being displayed if one is found.

On the other hand, a matching valid word may not be found and, after exhausting the possibilities of all substitutes from group 330-2 likewise, a jump instruction in the routine (equivalent to a signal issued on Address Line 354-2 in FIG. 5) directs the argument comparison to the next Table Portion 330-3 (Counter 346 being incremented by unity). The above-described series of steps is again repeated until all possible typographical substitutes in portions 330-3 and 330-4 relating to the designated character of the original word have been checked. At this point, a signal will issue on Line 356 to Selection Register 310 causing it to "step" and indicate the Offset 465 identifying the beginning of the next most frequently used corrective information (assumed here, as stated earlier, to be Class II-Phonetic Equivalents, but only for purposes of discussion, the order of selection actually being controlled by SASM 312, as will be discussed later).

At this point then, consider checking the current word in Register 344 for next most frequent errors, assumed here to be in Category II-Phonetic Equivalents.

This next category comprises the Phonetic Equivalents routine of Box 324 (FIG. 4) based on use of a corrective Table 334 having 54 sections (II-1 to II-54 in FIG. 5) each containing anywhere from two to twenty-four phonetic equivalents (see Appendix B) potentially identical to a given incorrect character or string of characters in the erroneous word. It should be noted here that Table 334 is stored in memory subsequent to Table 330, the first of the category tables in Ram 254. The starting location of Table 334 is an offset to that for Table 330, this offset being shown symbolically as the line 340-1 in FIG. 5. Phonetic equivalents in each subsection II-n are stored in sequence, each separate equivalent being distinguished by addition of a "ONE" in bit 7 of the character byte, if the equivalent is a single character; or in the same bit position of the final character byte of the string, if the equivalent is a string of two or more characters.

Correction of the erroneous word in Register 344 for presence of an improper phonetic equivalent may be performed by first scanning that word for presence of a character or string of characters forming part of the list of equivalents in a given one of the groups (e.g., II-n) in the above-mentioned Table 334. Note that, as mentioned previously, the sequence of groups shown in Appendix B is an initial one only, and that the statistics of occurrence of a given phonetic error causes the group in Table 334 containing the most likely replacement character (or string of characters) to be placed first in the sequence. This is accomplished by the Variable Group Sequencing or "bubble up" process mentioned earlier and described shortly.

Each group or section II-n is checked in turn, of course, all equivalents in the given section being compared successively in known fashion for a match with a like sequence of characters in the erroneous word. For example, the first character of the initial phonetic equivalent stored in Table II-n (where n varies from 1 to 54 and the table selection—see FIGS. 4 and 5—is determined by the offset value entered in SASM 312 in the manner described subsequently) is compared with each character of the erroneous word. If the comparison leads to a match, i.e. a phonetic equivalent in the list of section II-n is identical to a character (or string of characters) in the erroneous word stored in Register 344, then a "Phonetic Equivalent Matches" (PHOMAT) Flag 374 is set and the first phonetic equivalent (that stored at the beginning of section II-n) is transferred to Display Buffer 262 in place of the potentially erroneous one found above in Register 344, all other characters of the word in Register 344 being transferred in normal fashion. The amended word in Display Buffer 262 is then compared with the words of Dictionary List 56 and if found to be valid in the manner described in References I and II, Display Word Flag 412 is set and the contents of Display Buffer 262 sent as usual to Display 16 in known manner for viewing by the typist.

The above-mentioned transfer to Buffer 262 is performed under control of Character Counter 39, Data Pointer 258, a Pointer 360 (which may be the known B Register in Microprocessor 24), and the Display Buffer Pointer 264, as before, together with a further Counter 370 which contains the number of characters in the potentially erroneous equivalent found above in Register 344. During the search for presence of a phonetic equivalent, Counter 370 is initially reset to ZERO and then incremented so long as there is agreement between the characters at identical locations of Register 344 and a Working Register 372 available in the RAM area 24E of Microcomputer 24 in which each character of the string is stored temporarily. If the last character (bit 7 at ONE) of the string in Register 372 is identical to the corresponding character from Register 344, then a ONE is entered into the above-mentioned PHOMAT Flag 374. A disagreement between characters from each of the above-named registers at any location prior to the last character, results in terminating further comparisons and initiates a search for a byte in section II-n containing a ONE in bit 7 (the end of the string) so as to locate the next phonetic equivalent in section II-n to be tested in the above manner.

As explained previously, if the end of the list in a given section II-n is attained without a match being found between any of its phonetic equivalents and the sequence of characters in the erroneous word, then an "End-of-list" (EOL) code (00 in hexadecimal notation) is detected and a signal issued on line 354-II to indicate that none of the phonetic equivalents in section II-n of Table 334 was found in the character sequence stored in Register 344. Accordingly, a Phonetic Equivalent Counter 356 is incremented to point to the address of the next section II-(n+1), and search of that new list of equivalents is made for presence of a phonetic equivalent matching a character (or character sequence) in Register 344 in the same manner as just described. As is usual, if all the sections II-1 to II-54 of Table 334 fail to yield the match being sought, then the bottom of Table 334 will be attained as indicated by detection of an End-of-Table character (0000 in hexadecimal notation), with resultant presentation of a "No Alternatives" message in Display 16.

Consider next Category III. If the erroneous word is not correctable in the previous fashion, then the Auto-Spell Program 303 proceeds to check for the third most frequent category of errors, assumed here to be the erroneous entry of a random, simply incorrect or "just plainly wrong" character ("JPW" as it will be termed hereinafter). Here again, as shown in FIGS. 4 and 5, choice of Category III by Selection Register 310 establishes a routine 320 which draws directly upon a single twenty-six byte alphabetic Table 333, the contents of which are substituted byte-by-byte for each character in the successively designated locations of the erroneous (current) word in Register 344 in a known fashion. Thus, for example, the characters of the word in Register 344 are transferred directly to Display Buffer 262 under control of Display Counter 264 until agreement between the values in Character Counter 39 (defining the "active" character position) and Replacement Pointer 360a (another use of the B register) is detected, at which event the substitute character (obtained from Table 333 and stored in the one-byte Replacement Character Register 368) is transferred in place of the character otherwise read from Register 344. The process then continues with transfer of the remaining characters from Register 344 until the EOW character (space or blank) is detected. As before, the modified word is first checked against the content of Check Buffer 366 before proceeding to comparison with the listing of Dictionary 56. If the modified word is in Buffer 366 or a match with a valid word is not found, the next character from Table 333 is obtained (Data Pointer 258 being incremented for that purpose), stored in Replacement Character Register 368, and the foregoing process repeated until either a match is found with a word in the listing of Dictionary 56 or until the end of Table 333 (EOT) is detected as previously described.

Assume now that the next-most frequent errors lie in the area of Category IV-Transpositions. Here, the routine of Box 316 merely transposes two characters at a time: one at a position designated by the value in Character Pointer 39 and the other designated by that same value plus one. The routine begins essentially with Data Pointer 258 designating the first character of the current word stored in Register 344 and a "Transposition Pointer" 360b (the B Register being used here also) initialized (zeroed) to indicate the first character position involved in the transposition, while a known "Working Register" 264 (available in Microprocessor 24), also initialized to Zero, acts as a counter pointing to the character entry position in Display Buffer 262, which buffer controls the character output to Display 16.

Since the counts in Pointers 39 and 360b at this time are equal (determined by a known "CJNE" instruction which merely steps to the next instruction because of the equality), the time to transpose is at hand. Accordingly, the current character pointed to by DPTR 258 is fetched and entered into Accumulator 29a (known) of ALU 29, and Working Register 264 incremented so as to point entry of the current (first) character from Register 344 into the second position of Display Buffer 262. Working Register 264 is then decremented, while DPTR 258 is incremented to point to the second character of the current word which is then entered into the Accumulator 29a and transferred as above into Display Buffer 262, this second character being placed in the first position of Buffer 262 as required by the preceding decrementation of Register 264.

Having taken the first and second characters of the current word in Register 344 and transferred them to Display Buffer 262 in transposed order, the routine then transfers the remaining characters from Register 344 to Display Buffer 262 in their existing order until a blank is detected. At that point the "trial" word—the original word as modified by transposition—is compared with the word list of Dictionary 56 in the manner described in References I.

If the trial word is valid (indicated by setting the EOW Flag 35 when the prescan described in References I finds a word Terminator WT 112 as the next character in Dictionary 56) and the typist accepts that word as the desired one by pressing Carrier Return or "new line" Key 20R, then erasing of the erroneous word (with erasing and realigned printing of subsequently entered characters as well) may ensue in the known manner briefly described previously.

On the other hand, if the trial word is rejected—even though valid—by pressing Index Key 20I, that word is stored in a "Trial Word Buffer" or "Check Buffer" 366 (1000 bytes long)—along with any other words similarly rejected—so that it is available for preventing time-consuming duplicative searches, or at least significantly decreasing their number. Accordingly, after each modification of the original erroneous word stored in Register 344, that modified word is compared first with the contents of Check Buffer 366, as evident.

When the word modified by transposing the first two characters is not valid—that is, not found in Dictionary 56—Character Pointer 39 is then incremented and transposition of the second and third characters performed in like manner to the foregoing in order to form a new trial word in Display Buffer 262. As before, the newly modified word is first compared with each word in "Check Buffer" 366 for the reason just given, and only then does Control 300 proceed to a comparison with the contents of Dictionary 56. Likewise, if the newly modified word is valid, the typist may accept it (by pressing Return Key 20R) or reject it (by pressing Index Key 20I) with the above-described consequences. If rejected, transpositions at successive character locations will be tested until all locations in the word have been checked. Each rejection first causes the previously-mentioned storage of the modified word in Trial Word Buffer 366 where it is then available to eliminate or decrease the number of duplicative searches.

In the latter case (all characters checked for Transposition errors), as will be assumed for purposes of this description, the Auto-Speller TM Program 303 moves on to a check for the next-most prevalent source of errors. According to the arbitrary sequence of presentation here, this next check should be Category V-Omitted Characters, on the assumption that the first four categories were checked but did not give rise to presentation of an acceptable word in Display 16. In the category being considered at present, the word is incorrect because the typist omitted a character somewhere between the first character and the end of the word (presumably not the first character because ordinarily that would be relatively easy for the typist to detect visually either on Display 16 or on Sheet 15a). Hence, the correction process (Box 318 of FIG. 4) comprises insertion of a succession of replacement characters at a position before each given character of the incorrect word (again recalled and stored in Register 344). To this end, Character Counter 39 is also used here to designate the active position (insertion point), while Working Register 264 acts as a counter pointing to the character entry location in Display Buffer 262, and Data Pointer 258 selects the next character to be read from Register 344. An "Insertion Pointer" 360c (for which one may again preferably use the previously-mentioned B Register) determines the location at which to insert the character selected from the appropriate one of the six Tables 332-1 to 332-6 (FIG. 5). Each of these last-mentioned tables consists of a mutually exclusive set of four to five alphabetic character codes (e.g. ABCD, EFGH, etc), one set including the code for the apostrophe in order to provide for checking the more common contractions (e.g.—don't, didn't, etc). Furthermore, the characters of the alphabet are broken into arbitrary groups for Table 332 (see Appendix C) because it has been found that a given typist tends to omit only certain characters, hence checking for omissions can be shortened materially by providing different groups and prioritizing them as indicated earlier—i.e. putting the most frequently successful group first.

To this end, a Variable Group Sequencing or "bubble up" procedure—described in greater detail subsequently—is followed. This procedure places at the head of the character groups (or characters in some cases) within a given category, that group which contains the character (or string of characters in the case of phonetic equivalents, as was seen) most often causing successful corrective modification of the erroneous word. While mentioned just with respect to omission of a character (Category V) the bubbling up procedure is applied also to other categories having multiple groups or characters (I—Typographical Errors; II—Phonetic Substitutions; and III—Simply Incorrect or "JPW" Characters).

In any event, successive characters of the alphabet (together with the apostrophe, as stated above) from Table 332 are inserted into each sequential position of the word in the above-described manner until all locations in the erroneous (original) word in Register 344 have been checked to determine whether it can be corrected into a valid word by insertion of a missing character into the sequence transferred to display Buffer 262.

The next category is VI-Extra Character and concerns presence of an extra character somewhere within the word. For this condition to be corrected, it is merely necessary to delete such character (other than the first, as stated earlier) and compare the modified word as before, first with the content of Buffer 366 and then with the listing of Dictionary 56. The deletion is performed in a fashion somewhat similar to the routines described previously for insertion of omitted characters (Category V above), or substitution of characters (Category I), in that the same Counters 39, 360 and 368 are utilized, but agreement between Counters 39 and 360 being used here only to determine the instant at which to suppress normal transfer of a character from Register 344 to Display Register 262. If comparison with the listing of Dictionary 56 shows that the shortened word is not valid, then Character Counter 39 is incremented and transfer of the current (erroneous) word in Register 344 repeated, but with deletion of the next character (because of incrementing Counter 39). The newly amended word is again checked first with the content of Buffer 366 and then with the listing of Dictionary 56, etc., etc. Should none of the deletions lead to a match, then detection of a blank in Register 344 causes display of an "End of List" message on Display 16. Equality of Counter 39 and the value in a "Bad Character" Register 370 may also lead to the foregoing result, with progression to the next category of corrective information. Register 370 stores the position (ordinal location) at which character entry through Keyboard 10 gave rise to the warbling audible output by Alarm Device 19. The Deletion activity does not proceed beyond the count in "Bad Character" Register 370 because any single extra character must be at the "Bad Character" location or previous to it.

The foregoing is followed by a return of control to the Selection Register 310 for selecting application of the seventh and last category of corrective information. According to the arbitrarily assumed order of frequency, this last corrects for occurrence of a shift in the lateral position of the typist's hands relative to Keyboard 10, either right or left (the latter being checked first). For correction, the characters of the incorrect word in Register 344 are transferred to Display Buffer 262 without change up to the location of the character giving rise to the signal from Alarm Device 19 which indicated an erroneous word—thereafter the character codes are converted to those for the correct adjacent character in accordance with an appropriate one of two series of character codes, each series compensating for the effect of the particular direction of the lateral shift (e.g., for a left-shift of the hands, downward motion of the third finger—the thumb not being counted—of the typist's left hand presses the "a" key, the code for which must be corrected to that for the "s" which the typist intended to enter). The two series 380, 381 are stored in sequence (the "shift right" series first) in the form of a Table 382 similar to Table 78 of References I, where the five-bit value for an alphabetic character (an ordinal count, as described in References I) is used as an offset from the address of the first code of each series, in order to obtain the code at the modified address yielding the correct character as replacement for the erroneous one which triggered the signal from Alarm Device 19. Succeeding characters of the shifted input are corrected in the same fashion and the thus corrected or "trial" word compared as before, first with the "Check Buffer" 366 and, if not located there (i.e., not previously tested and rejected), then with Dictionary 56. If the latter comparison also does not yield a match, correction according to the other of the two series is performed by comparison of the "trial" word prepared using the Shift Left Series 381, in accordance with a "ONE" set in a "Right Adjustment" Flag 384 at start of the validity check on the word modified according to series 381. Note that characters prior to the erroneous one are merely moved directly into Display Buffer 262 as they are read from the current word in Register 344 under control of Pointer 360.

Having given a general description of the methods for performing corrections according to each particular category, consider next the events occurring in response to depression of Auto-Speller Key 302 when Device 19 has signaled the typist's entry of an incorrectly spelled word and the most probable alternative word is to be developed and displayed in the manner shown in the flow chart, FIGS. 3A–3L. As evident in FIG. 3A, the first action in the Auto Spell Program 303 is to determine (Diamond 386) whether the character at the carrier location on Printer 14 (if in the previously described Typewriter Mode) or at the cursor location in Display 16 (if in the previously described Line Mode or Memory Mode) is alphabetic, with return (388) to the main program 40a and presentation of an "Error" message on Display 16 if not alphabetic. Otherwise, Box 390 provides for a known initializing of the text storage area in RAM 254 by blanking all 75 bytes of the Template Register 344, 25 bytes of Display Buffer 262, and 216 bytes of Multiple Offsets Buffer 560. Following this, the values in Current Character Position Register 32 relative to line 15 of Printer 14, a Current Cursor Position Register (not shown, but known), and the usual Memory Pointer (likewise not shown, but known) are saved in appropriate bytes for future recall at the end of Spell Program 303, as stated in Box 392. Further, Register 344 having been cleared, the current word to be corrected—defined by the spaces (or other punctuation) at its end and beginning, as detected by the previously-described reverse scan—is transferred into that same Register 344 as per Box 394. Then, the various flags and pointers are initialized in accordance with Box 396 (e.g. SPELL Flag 307 set to a ONE; PHOMAT Flag 374, Done Flag 376, Weldun Flag 440 and Shift Right Flag 384 reset to ZERO, etc.; End-of-Buffer Pointer 429 and Bottom Pointer 464 set equal to the beginning address of Check Buffer 366; and Character Counter 39 and other counters previously mentioned reset to ZERO or other appropriate values).

Next, Box 398 calls for display of the message "Thinking" in Display 16 (as previously mentioned) which is followed by a jump to the Spell Monitor Routine 402 (FIG. 3B) in accordance with Box 400. That routine first calls for checking any input from Keyboard 10 as described in detail in References I) per Box 404. If that input is detected (Diamond 406) as being Auto-Spell Key 302 (by a known masking technique, for example), then the path leads to Spell Return 388. If Auto Spell Key 302 was not pressed, then the routine proceeds to Diamond 408 which asks if the key pressed was Forward Index Key 20I. If so, the path goes to Diamond 410 to determine whether a word is available to display—namely, whether Display Word Flag 412 is at ONE. If a word is available, Routine 402 proceeds to Box 411 for display of that word, calling for clearance of text from Display 16 and conversion of the word in Buffer 262 into matrix code by use of Matrix Converter 222, followed by transfer to Output and Display Controls 305 for presentation in Display 16, all in known fashion. If a word is not available for display (the NO path from Diamond 410, program 303 moves on to the Spell Mainline Routine 414 of FIG. 3C where actual application of the corrective procedures 314-326 is performed pursuant to the descriptions given earlier and—according to the invention—in the particular sequence chosen by Selection Register 310 under control of SASM 312, as detailed shortly.

On the other hand, if the key pressed is the Reverse Index Key 20RI (Diamond 416), the alternative word previously presented (now stored in Check Buffer 366) is retrieved (Box 418) in a known manner essentially as sketched above (more detailed in Reference II) for known replacement of the word presently appearing in Display 16. Program 303 then moves on to Spell Mainline Routine 414 of FIG. 3C as before.

If the key pressed is neither of the foregoing keys, being the Return Key 20R which ordinarily (i.e., typewriter mode) positions Printwheel 17 (rotated to a daisy rest position as known, but not shown) at the start of a new line on sheet 15a, but here behaves in fashion similar to that described in Reference II—namely, its depression (YES answer at Diamond 420) indicates the typist's acceptance of the correctly-spelled word in Display 16 as the intended word. Hence, Spell Monitor Routine 402 steps to Diamond 422 where the status of Display Word Flag 412 is again checked. If a ONE is found, then (Box 424) the word currently presented in Display 16 is to be accepted and hence, according to the invention, the statistical data in SASM 312 are to be updated in addition to the usual known correction of the data in memory (Correction Buffer 54) and the printed text on sheet 15a. These activities are shown by a jump to the subroutine continuation 424a in FIG. 3E, where Diamond 462 asks whether the message "No Alternatives" is to be displayed, which is the case of Check Buffer 366 is empty. That condition is indicated by an equality upon comparison of the value in a Bottom Pointer 464 (which stores the address of the last byte in Check Buffer 366) and the address of the first byte (not shown, but known) of that same Buffer 366. If the equality exists, the above-mentioned message is presented in Display 16, the MES Flag 438 is set, and subroutine 424a proceeds to the usual Return 388.

If an alternative does exist (inequality leading to the above result in such case), the next task is to update the statistical counts as indicated in Box 466R. This process involves the subroutine 466R shown in FIG. 3K. There, the first step—shown in Box 468—is to set Data Pointer 258 to the starting address of a Table 454 (part of SASM 312) storing in a succession of three bytes: the count, the weight and the rate for each category of error in the sequence shown at left in FIG. 4, the Roman numerals identifying the order of appearance. Thereupon (Box 470 of FIG. 3K) the current Offset 465 is obtained from Selection Register 310, multiplied by 3 to account for interleaving of the above-mentioned weight and rate information, and the product added to the value in Data Pointer 258 to determine the address of the Count 508-n for the category (I-VII) supplying the corrected word chosen by depression of Return Key 20R. Having located that count, Box 472 calls for its incrementation—in accordance with the invention—to evidence the greater likelihood of that category being the source of the correctly modified word when the next spelling error occurs. There is then a return 388 to the routine 424R shown in FIG. 3E.

After updating the Count 508-n, the statistical offsets for elements within that category are also updated as required by Box 474 and shown in detail in the subroutine 472r of FIG. 3L. Updating of these offsets for statistical purposes implements the Variable Group Sequencing or "bubble up" procedure which causes Program 303 to check first the corrective information group (e.g., group I-3 of Table 330) most frequently used in providing a valid word acceptable to the typist when the related category is selected. In this subroutine 474R, the first Box 476 calls for the starting address of an Offset Update Table 478 to be entered into Data Pointer 258. Table 478 stores addresses locating the Group-Offset listings (336, 338, 339 or 340 shown in connection with FIG. 5). Addition of Offset 465 to Data pointer 258 points to the address of the listing corresponding to the chosen category. Following this, the next step jumps to the Subroutine 474R for updating the offset sequence in the selected one (e.g., 336) of the above-mentioned listings, first pointing to a Byte 488 termed an "Offset Pointer" and located at start of the selected group-offset listing. A respective Byte 488 is located at the head of each listing and stores a count—initially zero—which identifies successive addresses each storing an offset to a discrete one of the groups in that category. Each listing precedes the first corrective information elements (e.g. 348, 350) stored in the related category—Typographical Errors, say, in the four groups 330-1 to 330-4 of Table 330. The start address of the selected listing is immediately saved in an eight-byte Register 484 for subsequent use, after which the next Box 486 calls for obtaining the current value in Offset Pointer 488 (one byte) and comparing (Diamond 490) that value with the hexadecimal number "OFFH". If the values agree, Pointer 488 is at EOT (the end of the table), and Routine 424R performs another return 388. If the current value in Pointer 488 is not OFFH, the next Box 492 causes addition of that current value to the low four bytes of the start address saved in Register 484 (with incrementing of the high four bytes if a carry is generated) and the resultant sum stored in DPTR 258. What will be termed herein as the Correct Offset (Box 493) is then the data byte of the selected one of the listings (336, 338, etc.) read at the modified address in DPTR 258, which data are saved in a Temporary Register 491 as the Offset to the desired group.

For purposes of effecting the earlier mentioned "bubble-up" of the "active" group's corrective information in the selected category (Box 470 of FIG. 3K), moving of the Correct Offset to the top of the corresponding table (336,338, etc.) is desired according to the invention (e.g. the address of Group 4 in Table 330 being provided, say, when Offset Pointer 488 is next at ZERO rather than the address of Group 1 as a result of Group 4 having been "active" by supplying the corrective information leading to modification of the incorrect word into a valid word). Therefore, to make room for the Correct Offset, a down-shifting of the preceding offset information in the corresponding table must also take place. The process (Boxes 494, 495 of FIG. 3L) uses three Temporary Registers: the Working Register 264 mentioned previously, an additional Working Register 496, and the B Register 360. The latter of the two Working Registers (496) is set to the address in Offset Pointer 488, whereas Register 264 is set to an address which is smaller by unity, and the B register 360 is initially set to the value in Temporary Register 491. The Offset data byte at the location in the corresponding table—336, say—identified by the content of Register 264 is read and written into the next lower location of table 336 (actually an address higher by one unit, the top of the table being at a lower address)—namely, the location identified by the content of Register 496. Initially, that content is the location of the data byte being vacated by transfer of the "Correct Offset" to the top of table 336 (transfer yet to be completed, as will be seen). In that fashion, the Offset data byte at the preceding address is down-shifted.

Next, Registers 264 and 496 are both decremented and the down-shifting process continues in loop fashion until Register 360 (or equivalent) reaches ZERO, being decremented once in each loop and causing a jump to a repeat circuit of the loop if non-zero. At that juncture Register 494 points to the top of the corresponding table (e.g. 336) and the Correct Offset data are finally transferred from Temporary Register 491 to the top of that table.

The updating shown in FIG. 3L being completed, a Return 388 to FIG. 3E is effected, and there Box 498 calls for incrementing the Total (stored in a two-byte Register 500) to allow for the augmented count of the selected category (Box 472 of FIG. 3K). Thereafter, in accordance with the invention, Box 502 calls for recalculation of the selection information so Selection Register 310 will choose the most likely category of corrective information based on the latest statistical information, in case the most recent development of a valid word caused a change in designation of the category of predominant errors.

Subroutine 502R for performing this recalculation is shown in FIG. 3F, where the first Box 506-1 instructs the program to enter the address of the Typographical Error Count 508 (one byte in Table 454, FIG. 6) into Working Register 264. In the next Box 510, Subroutine 502R calls for calculation (see FIG. 3G) of a corresponding Weight and a Rate for decrementing the weight should corrective information fail to yield an acceptable valid word from Dictionary 56 upon being applied to the incorrect word (as described subsequently). The weight is a bias value responsive to the count data for the given category relative to the Total Count in Register 500, whereas the rate for decrementing the weight is a factor which adjusts for the different number of groups (e.g. 331) in a given category (e.g., 4 groups in Typographical Errors, 54 groups in Phonetic Equivalents, etc.). It may be appropriate here to mention that the weight and rate each occupy one byte and that for ease of accession (designation by Offset 465) these bytes directly follow one another immediately after the related Count byte 508 in Table 454 (see FIG. 6). Furthermore, the Count, Weight and Rate combinations 528 for all seven categories are also stored in immediate succession for the same reason.

As shown in FIG. 3G, the weight and rate calculation routine 510R comprises obtaining the Count 508-n (Box 512) for the relevant category pointed out per Box 506-n in Subroutine 502R (FIG. 3F, the first pointing being that to the Typographical Error Count in byte 508-1), and storing that count in Register 264, followed by obtaining (Box 514) the Total Count of all categories from Register 500 and division (Box 516) of the latter by the former, in known fashion, the quotient (Total/Count) being developed in Accumulator 29a of Microprocessor 24, as is usual. That quotient is limited (Box 518) to an integral number between 0 and 7 by right-shifting Accumulator 29a (dropping any fractional data bits) in known fashion and then subtracting the integer in Accumulator 29a from the value "8". If there is a borrow, the quotient exceeds the above-mentioned limit so the value 7 is entered into Accumulator 29a instead. The weight and rate information are then obtained from what may be termed a W/R Table 522 (see Appendix D) in which there are stored in successive bytes: the Weight (an integer from 1 to 240) and the Rate (an integer varying from 1 to 200 and being not only integrally divisible into the current weight for the associated category of corrective information but also directly related to the number of groups into which that corrective information is divided—e.g. in Appendix D presented hereinafter, the first line for Typographical Weights and Rates shows a Weight of 240 and a Rate of 60 in accordance with grouping of this first category of error into the four sets shown in Appendix A.

The above-derived quotient is next multiplied by 2 to yield an Offset value 465 (which may be ZERO) applicable to modify the starting address of W/R Table 522 (previously stored in DPTR 258 in accordance with Box 506-1 of FIG. 3F) to locate the relevant weight information byte (the multiplication —actually a single left shift of Accumulator 29a—being performed so as to skip over any intervening Rates). The desired weight is the data byte at the modified address in DPTR 258 and is transferred to the storage byte 524-1 adjacent to Typographical Count 508-1 in Table 454 (FIG. 6), the value in Working Register 264 (set to point to byte 508-1 as per Box 506-1 of FIG. 3F) being incremented for that purpose. Next, Accumulator 29a and Working Register 264 are both incremented and the former added to its respective pointer (DPTR 258) such that the sum locates the corresponding Rate in Table 522 and enter it into the byte 526-1 of Table 454 adjacent the weight just written into that same table. As seen in FIG. 6, storage of that Rate occurs in the third position of the triplet set 528-I relating to statistics for Category I—Typographical Errors.

Figure 3J:
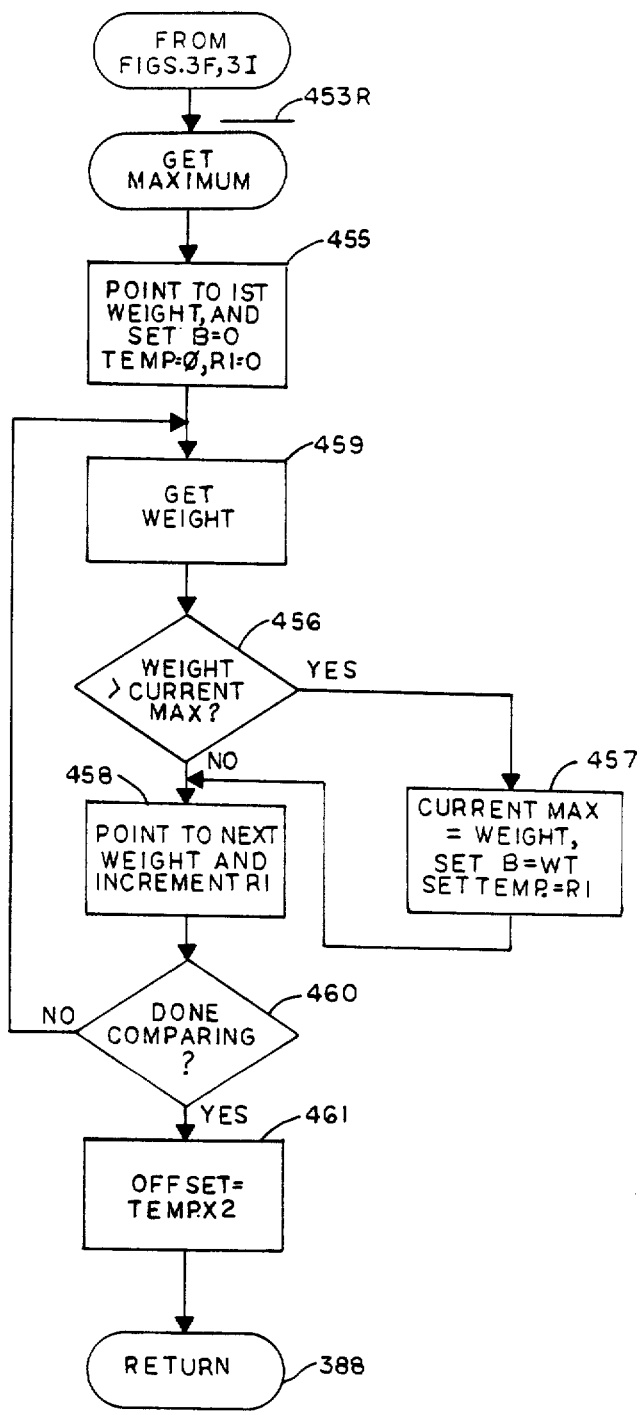
Figure 3H:
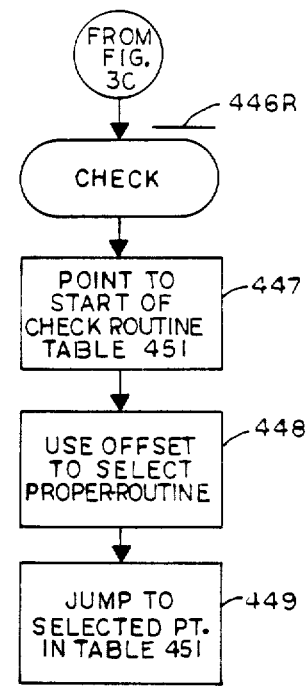

Having finished calculations for that first category (Box 506-1), Program 303 returns to FIG. 3F, where the same statistical calculations of Weight and Rate are performed successively for the remaining six of the seven categories. These calculations include similar Boxes 506-2 to -7, each likewise pointing to an associated Count Register 508-2 to 508-7, followed in each case by a call (Box 510) for calculation routine 510R (FIG. 3G), performed in like fashion to that just described. On the seventh loop through Routine 510R, the return to FIG. 3F proceeds via solid line 525 to the previously-mentioned Subroutine 453R which performs the most important calcuation of Auto-Spell Program 303 of the present invention—namely, computation of the value (Offset 465) to be placed in Selection Register 310. Subroutine 453R (identified by the mnemonic "GETMAX" hereinafter) is shown in FIG. 3J.

In the "GETMAX" subroutine 453R, the instructions in the first Box 455 call for initially setting a ZERO as the contents of a "Maximum Weight" Register 360d (the B Register preferably being used again) so that the current maximum among the seven weights 524-1 to 524-7 just calculated by subroutine 510R (Calculate Weight and Rate) may be stored therein after comparing all seven of these weights. The purpose of subroutine 453R is not solely that of determining the maximum weight, but more specifically the establishment of the identity of the category associated with that weight so that it may be selected first as the source of corrective information when the next spelling error occurs. To that end, Subroutine 453R makes use of Temporary Register 491 (previously mentioned in connection with the Update Offset Subroutine 474R) and Working Registers 264 and 496 (R0 and R1, respectively, in Microprocessor 24). Temporary Register 491 eventually stores a number identifying the category most frequently used, while Working Register 496 keeps track of the number of comparisons made, there being seven in total of course. Both of these last-identified registers are set to ZERO shortly after clearance of Register 360d (the sequence not being critical) while Register 264 is then supplied with the address X+1 (X being an address in memory defining the start of Table 454, and chosen at any desirable value, as is known) locating the first Weight (byte 524-1) in Statistical Data Table 454 (see FIG. 6) which table forms part of SASM 312.

That first Weight is associated with Typographical Error-Category I (Box 214 of FIG. 5), as will be recalled. As shown in Boxes 455, 457 and 458 of FIG. 3J, in order to determine which of the Weight values in bytes 524-1 to -7 is the largest (therefore identifying the Category with the highest probability of successful correction to a valid word), the value in each byte 524-1 to -7 of Table 454 is successively compared with the content of Register 360 and —if larger—replaces that content as a tentative maximum, but otherwise is merely ignored except for incrementing Register 496, as shown in Box 458) and the process repeated for the Weight in the next byte 524-2, etc., etc. Thus, for the first comparison required by Box 455, the value in byte 524-1 is obtained and compared with the Zero in Register 360 and can only be equal to or greater than this last. The comparison is implemented by placing the Weight from byte 524-1 in Accumulator 29a and subtracting the content of Register 360, the state of the usual Carry/-Borrow Flag (not shown, but initially ZERO) indicating which is larger. If the content of Accumulator 29a is greater (i.e. Byte 524-1 non-zero), then in accordance with Box 457, the value in byte 524-1 is transferred to Register 360 and the comparison count (still ZERO) in Register 496 is transferred to Register 491, the Weight in Byte 524-1 being the tentative maximum. Thereafter, the count in Register 496 is incremented by unity to indicate performance of the first comparison and the address in Register 264 is augmented by 3 (incremented by three successive units, say) in order to skip the intervening Rate 526-1 and the Count 508-2). Next, the Weight of the next category (Byte 524-2 in this first instance) is obtained as per Box 459—provided the count in Register 496 is still less than seven, as will be seen subsequently (Box 460). The comparison is again performed, with a pass through Box 457 if the decision as to the relative magnitudes of the Weight in Accumulator 29a and the tentative maximum in Register 360, is that the former is the larger (the Carry Flag still at ZERO). In that case, the Weight in byte 524-2 is transferred in its turn to Register 360 as a new tentative maximum, and the comparison count in Register 496 likewise transferred to Temporary Register 491, as described above.

After Weights 524-1 to -7 (i.e. those in all seven categories) have been compared, the comparison count in Register 496 will have just been incremented to the value "7" and a comparison ("CJNE", known) with a seven entered in Accumulator 29a will reveal an equality, which equality indicates completion of the comparisons (Box 460) with resultant break out of the loop back to Diamond 456 through Box 459. Accordingly, at this point the value in Temporary Register 491 will indicate the one of the seven categories having the Maximum Weight and thus being the one with the corrective information for the type of error most frequently encountered. For purposes of selecting the proper routine for performing the correction (first), two bytes of address are required, so the address of each routine in the Table of Routines 451 differs from the address of the nearest neighbors on either side by two units. As a result, Box 461 shows that the actual Offset 465 for locating a particular routine is determined by twice the value in Temporary Register 491 (the value being doubled by a single leftward shift of Accumulator 29a, say, assuming the least significant bit to be at the right end of the byte, as usual).

The foregoing internal statistical activities having been completed, the corrected and accepted word currently presented in Display 16 (and stored in 5-bit code as previously described) is changed to the Daisy-position code (Converter 236) and transferred to Correction Buffer 54 in a known manner to replace the original word (essentially as briefly described in Reference II—i.e. insertion in place of the original word with appropriate known shifting of the contents of Correction Buffer 54 if the length of the corrected word differs from that of the original word). If system 8 is in Memory Mode (YES answer of Diamond 529), this deletion of the original word and insertion of the corrected word in its place in Correction Buffer 54 and Display 16 occurs as above (Box 531). If in Line Mode (YES output of Diamond 533), correction is the same as described next except as regards printing aspects. Lastly, if system 8 is in Typewriter Mode, the typist may correct the original word on sheet 15a by using Correction Ribbon 15b in "erase only" or "erase and delete" prior art fashion, and the corrected word typed in its place using Print Ribbon 15c. Preferably, however, if the word lengths differ, the misspelled word on Sheet 15a is corrected in a manner providing fully automatic erasure of the characters of any succeeding words and their re-printing in re-aligned fashion as described in the application USSN 000,698 entitled "Auto-Realigned Print Correction" and filed by Howard C. Duncan IV on even date herewith.

Conversely, if the word lengths don't differ, (YES output of Diamond 535), a simple word-for-word replacement may be performed, Daisy Carrier 17 relocated at the end of the text using the value previously stored in Current Character Position Register 32, and a Return (388) made to the main program 40a, as is known.

A switch may be present to detect lifting, say, of the usual sound-absorbing cover (neither shown, but lifting of the latter is known for changing Ribbons 15b, 15c; Daisy 17; or the like on Printer 14). Actuation of the switch indicates a need to abort Auto-Spell Program 303 temporarily, so Diamond 426 is the next step and Routine 402 again ends with a Spell Return 388. If the switch actuation checked in Diamond 426 is not detected, the Auto-Spell Program 303 proceeds to Spell Mainline 414, as before (FIG. 3C).

Correction activities are monitored in the Spell Mainline Routine 414, the ordinal sequencing of these activities being dependent upon the number of errors of each type which have occurred during use of system 8 in the past. The first step (Diamond 428) in Routine 414 is a check to determine whether any alternative words were found and stored in a FIFO Register 548. If the data byte at the address given in an End-of-Buffer Pointer (EOB) 429 contains data (i.e., contents of FIFO 548 non-zero), then a word is available to display. The "YES" answer to the question in Diamond 430 then results (Box 432) in the word stored in FIFO 548 being presented in Display 16 via the Output Controls and Drivers 305 over leads 74b in known fashion (see Reference II for more details) and in clearing the "Thinking" Flag 434, since the corresponding message no longer appears on Display 16. The routine then rejoins the main path at Diamond 436 for further activities described shortly.

Before proceeding with that description, it is desirable to revert to the "NO" answers to Diamonds 428 and 430. In the first case (Diamond 428), the result of a "NO" answer is the display of an "Error" message in Display 16 and setting of a Message (MES) Flag 438 as per Box 431 and is followed by a Return 388. This occurs if Index Key 20I is pressed while the "No Alternatives" message is displayed. As to the second case (NO answer for Box 430), the next step is a further interrogation (Diamond 433) as to whether checking has been successfully completed, this being evidenced if there is a ONE state for a "Completely Done" ("Weldun" hereinafter) Flag 440. Box 442 next shows that if Flag 440 is in the ONE state when Diamond 430 is interrogated, it causes Display 16 to show the message "No Alternatives" and sets the MES Flag 438 to indicate that Display 16 contains a message rather than a trial word. After this setting of MES Flag 438, Routine 414 again steps to a Return 388.

Conversely, if Flag 440 is at ZERO when interrogated as per Diamond 433, more checking of categories needs to be performed, but Routine 414 first moves to Diamond 437 where the instruction calls for a determination as to existence of any keyboard inputs, detection being made by means of the known periodic scan of the key switches (not shown in FIG. 1) of Keyboard 10 mentioned briefly earlier (details in References I or II). Accordingly, if a Keyboard input is detected, a Return 388 is again made to the main program 40a to identify that input in known fashion. On the other hand, if an input was not detected in Diamond 436, the path leads to Box 444 where the status of Weldun Flag 440 is again checked (the key pressed could be the Return Key 20R which would have caused Weldun Flag 440 to be set to a ONE). Again, if Flag 440 is at ONE, nothing further need be done in Routine 414, so another Return 388 is made.

If Flag 440 is, however, still at ZERO (indicating that further checks of error categories are necessary—i.e. at least one of the categories 314–324 remains to be checked) then per Box 446, the proper word correction check must be performed. In accordance with the invention, that check is the next category chosen by Selection Register 310 under control of SASM 312. As previously described, actual selection is performed by stepping from Box 446 of FIG. 3C to the "check" subroutine 446R in FIG. 3H. Upon selection of the proper category by taking the Offset 465 stored in Selection Register 310 and combining same with the starting address of Table 451 for the Check Routines, the requisite number of corrective checks (dependent upon the quantity of groups in the category, of course) are performed in succession, each correction of a given type (I to VII) occurring as described previously for the particular category. The corrected word formed in Display Buffer 262 in the manner appropriate to the category chosen by Selection Register 310 is then compared with the words stored in Dictionary 56 in the manner described in References I. If a match is found, the "Display Word" Flag 412 is set and a Return 388 made to Routine 414 (FIG. 3C), where the next step is Diamond 530, a repeat interrogation as to whether all possible checking has been performed. If YES (Weldun Flag 440 being in its set state), Routine 414 proceeds to Box 532 for clearing the Mulerr Flag 555 (set to a ONE on checking combination errors as described subsequently) and setting Weldun Flag 440 to a ONE, followed by a Return 388 to the Spell Monitor Routine 402 for awaiting the typist's pressing of the next key (presumably one of the keys 20R, 20I, or 20RI on Keyboard 10).

If all possible checking has not been completed (NO response in Diamond 530), Routine 414 steps to Diamond 534, where the interrogation concerns the need to check the above-mentioned combination errors when Program 303 has completed the checking of single errors. This need is established by the state of a Done Flag 376. If checking is not complete (Flag 376 still at ZERO), then Routine 414 proceeds to Diamond 536 where the question relates to the finding of a valid alternative (i.e. a match between the corrected word in Register 262 and a word stored in Dictionary 56). This is an important juncture in Routine 414, because failure to generate a valid alternative word (evidenced by the ZERO state of Display Word Flag 412) upon application of corrective information supplied by the selected category (or at least a group thereof) results in decrementing the corresponding Weight byte 524-n by the associated Rate 526-n, as shown by Box 538 which calls for an "Update Weight" Subroutine 538R when such a failure occurs.

Figure 3I:
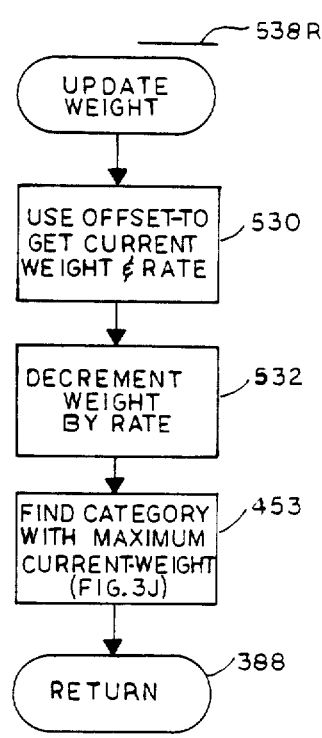

This last-mentioned subroutine, shown in FIG. 3I, complements the updating activities of Boxes 466, 474, 498 and 502 in Subroutine 424R by providing for greater separation between the Weight of the most frequently used category (any one of categories I to VII) and the next-most frequently used category which must be the successor one checked, if the former proved fruitless. This is accomplished by decrementing the Weight value in byte 524-n of Table 454 by the corresponding Rate 526-n upon occurrence of each unsuccessful check. A correction of the incorrect word in Register 344 which does not produce a valid word (Diamond 536) is indicated, for example, when an Endof-List code is encountered and Flag 412 is in the reset state. The End-of-List code is 00 (Hexadecimal) and occurs at the end of each group of corrective elements. Note that whenever a catagory I-VII (or group 331, 335 etc. of the multi-element section therein) fails to yield a valid alternative word and decrementation occurs, a category other than the one which proved fruitless will next have the maximum weight during the comparisons performed in the "Getmax" routine 453R and will thus identify that other category as being next in line for checking in the manner described above, a new Offset 465 being stored in Selection Register 310 as a result.

Consider next the activities which take place if a valid alternative has been found and the decision in Diamond 536 is a YES. This answer leads to Box 539 calling for the alternative word developed in Display Buffer 262 to be stored in a FIFO Register 548 for possible later utilization (as described subsequently). That having been done, Routine 414 then leads to decision Diamond 540 which asks whether the "Thinking" message is displayed (i.e. Thinking Flag 434 set to a ONE). This question is posed for determining whether this is a first pass through Routine 414, in which case Flag 434 is at ONE, having been set during the initialization phase. Assuming this to be a first pass, Flag 434 is at ONE, so Routine 414 turns back to Diamond 428, where presence of an alternative in FIFO 548 will force a YES answer to decision Diamonds 428, 430 and passage to Box 432 where the first word from FIFO 548 is copied to Display 16 in known fashion and Thinking Flag 434 is cleared. Routine 414 then passes through Boxes 436, 444 to Box 446 where a further word check is performed (using another element of the group—e.g., 331, 335 or whatever is applicable in the particular instance), followed by the NO paths through Diamonds 530, 534 to Diamond 536. There, the YES exit to Box 539 is taken if a valid alternative was found, that alternative being stored in FIFO 548 as before. On passing to Diamond 540, the NO exit will be taken this time with resultant further decrementation (Box 538 as described above) of the selected category's Weight, followed by completion of a loop back to Diamond 436. While the typist inspects the displayed word, that loop may be repeated several times with decrementation in Box 538 each time regardless of the decision in Diamond 536. This looping while the typist ponders the displayed word speeds up the presentation of further alternatives because ordinarily at least one alternative will be available immediately upon pressing of Forward Index Key 408 (see 410, 411 of FIG. 3B).

Conversely, if the answer to decision Diamond 540 is NO, the "Thinking" message is not present on Display 16. Routine 414 then leads again to Box 538 and its decrementations (see FIG. 3I) and return to decision Diamond 436. In either event, assume that Routine 414 leads to decision Diamond 534 where the answer is YES this time if checking of single errors is all done, so Routine 414 branches to Box 546 which calls for checking of combination errors. As will be recalled, such combinations are limited to Phonetic Equivalents in the embodiment disclosed herein for reasons of simplicity and because this category has been found to be the most common source of double errors.

Accordingly, in the corresponding Subroutine 546R shown in FIG. 3D, the first step is to a decision Diamond 540a which again questions whether the message displayed is the word "Thinking" (i.e. Flag 434 set, hence an alternative has not been found as yet). So, the message displayed is changed in known fashion to "Still Thinking" (Box 543) which indicates search for multiple errors of the Phonetic Equivalents type. Whether Flag 434 is in the cleared state or not, Routine 414 next leads to Box 550, where the relative length of the erroneous word in Template Register 344 is determined by subtracting five from the character count stored in a one-byte Register 552. If longer than five characters (known Carry/Borrow flag set), that word may possibly contain a second phonetic equivalent. Accordingly, if the number of characters is five or less, the Weldun Flag 440 is set to indicate absence of combination errors and subroutine 546R steps to Diamond 551 where the status of Thinking Flag 434 is again ascertained. If Flag 434 is in the cleared state, there is an immediate return to the mid-portion (Diamond 436) of Routine 414 whereas if Flag 434 is set, the message presented on Display 16 is first changed to a more appropriate one. As stated in Box 553, the new message is "End of List" if the hexadecimal code OOH was last read or "No Alternatives" if Check Buffer 366 is empty—a condition indicated by an equality between the value in Bottom Pointer 464 and the address of the first byte in Buffer 366, as previously explained. Thereafter, the same return to Diamond 436 of Routine 414 (FIG. 3C) is effected in anticipation of further action by the typist.

On the other hand, if presence of a second phonetic equivalent is possible (character length of the erroneous word being greater than five), the multiple errors ("Mulerr" hereinafter) Flag 555 is set to a ONE per the next Box 554 (FIG. 3D), and Subroutine 546R proceeds to Box 556 which orders a special initialization entailing the clearing of a one-byte Temporary Character pointer ("TCHRPN" hereinafter) 557 and the setting of a "Multiple Phonetic Offset Pointer" 564 (also one byte) to contain the number "1", for reasons detailed shortly.

Next, in order to assure that only additional checking of phonetic equivalents will ensue, Box 558 requires that the weight values in the bytes 524−1 and 524−3 to −7 of Table 454 (FIG. 6) be zeroed, while the Offset value 465 is set to the number "2" such that Selection Register 310 can only choose the Phonetic Equivalents routine 324 of FIG. 4 and only the phonetic Table 334 will be considered. "Done" Flag 376 is also cleared at this point for reasons becoming evident subsequently.

As will be recalled, when a first round of substitution of Phonetic Equivalents was being checked as per the selections of Box 446 in FIG. 3C (Subroutine 446R of FIG. 3H having used Offset 465 in Selection Register 310 to choose the corresponding category 324 of FIG. 4), each invalid modification of the erroneous word in that fashion was saved by storing two items in adjacent bytes 562a, 562b of a Multiple Offsets Buffer 560 (designated as "Muloff" hereinafter and having a 216 byte capacity). The items stored were (a) the number of "good characters" and (b) an "internal"offset locating the section II-n which gave rise to the modified word. The number of "good characters" 562a is the value previously stored in a Character Count (CHRCT1) Register 552 upon issuance of a signal by Alarm Device 19 to indicate entry of an erroneous character, the value stored being copied from the Character Counter 39 reading at that time. The "internal" offset 562b is the value stored at the Group-Offset address listings 483-n (where n varies from 1 to 54) in accordance with the particular group which yielded an invalid first subsitution. During subroutine 446R, these two values are stored in adjacent byte pairs 562 of Muloff Buffer 56 in stack fashion for each pair 562, the highest values for the number of good characters locating a related pair 562H at the top of the table and other pairs 562 having lower numbers of good characters being stored successively further from the top of Buffer 560 in known fashion, the number of good characters in Register 552 being compared with the value in the first byte of each pair 562 to determine if the former is larger.

Note that the word amended per a particular element 335 of the group II-n designated by the pair 562H and having the highest number of good characters, may not represent the base on which subsitution of a second phonetic equivalent will yield a valid word, even though that pair 562H is the most likely candidate. Accordingly, if a valid word was not obtained by the above-mentioned second substitution of successive ones of all possible phonetic equivalents 335 in the groups II-1 to II-54 of Table 334, the routine proceeds to Diamond 559 to determine whether Muloff Buffer 560 contains any additional byte pairs 562. This is accomplished by incrementing Muloff Pointer 565 to point to the next offset information 562-n and if that information byte 562a is empty (all zeroes), then a jump is made to Box 553 where an appropriate message ("End-of-List" or "No Alternatives") is presented in Display 16 as described earlier. If that offset information byte is not a zero, the offset is added to DPTR 258 to select the group associated with the best word "once-modified" to correct an improper phonetic equivalent.

Having initialized the various counters, pointers and registers (e.g. 557, 564 and 310, 524−1 and −3 to −7), as described above, and determined that Muloff Buffer 560 contains at least one more byte pair 562, the once-modified word having the highest number of good characters is regenerated using the number "1" in Second Phonetic Offset Register 564 as an offset to point to the byte next to the top of Muloff Buffer 560 so as to retrieve the "internal" offset stored in the second byte 562b of the pair 562 occupying the first two bytes of Buffer 560. As just mentioned, that "internal" offset selects the group II-n associated with the word having the highest number of "good characters" and thus more likely to produce an acceptable valid word upon amendment by further substitution of phonetic equivalents. To this end, the "internal" offset 562b is added to DPTR 258 to select the proper group II-n (namely, that associated with the highest number of good characters) and the erroneous word in Template Register 344 amended as described before to reconstruct the related invalid modification. This last is then copied to a New Template Register 572 for detection and replacement of a further phonetic equivalent by application of the equivalents 335 to 335n of all 54 groups II-1 to II-54 in Table 334. Detection and replacement are performed in the identical manner described previously except that the closest erroneous word now being in New Template Register 572, comparison of equivalents 335 will here be made with characters from that register at the positions designated by Character Counter 39. Because the same gamut of equivalents was checked previously and the first replacement of a phonetic equivalent 335 led to a word having good characters up to the position where Alarm Device 19 emitted its warning signal, subsitution of further equivalents need only be attempted at points ending with the bad character. Hence, as called for by Box 570, the new word in Register 572 is checked against Dictionary 56 in the manner disclosed in the copending applications. Identification of the character position where the modified word becomes invalid is performed next (Box 574), the value in Character Counter 39 at that point being copied to Bad Character Register 370. Thereafter, Subroutine 546R returns to the midportion 559 of Mainline Routine 414 (FIG. 3C), proceeding through Diamonds 436, 444 to Box 446 where further rounds of comparisons to locate a second phonetic equivalent are performed in identical fashion to those involving Template Register 344 except for the problem that updating of the weights (Box 538 in FIG. 3C) reduces the weight figure for the Phonetic Equivalents category in Table 454 (FIG. 6). Upon completion of comparison using all arguments 335 of a given group II-n, therefore, the EOL signal (354-II in FIG. 5) causes a new setting of Done Flag 376, the set state of which identifies these further rounds as being related to the search for and correction of a second phonetic equivalent in view of the set state of Mulerr Flag 555.

Accordingly, a renewed pass through Subroutine 546 (FIG. 3D) is instituted for the particular purpose of reapplying the initializations required by Boxes 556 and 558, in order to reinstate the dominance of the Phonetic Equivalents Category II altered by the decrementation which occurred per Box 538 after the above-mentioned comparisons. Finding of a second phonetic equivalent and its correction by the most-likely alternative at the "top" of Table 334 then follows in the same manner as described for the first round of scanning the erroneous word for an improper phonetic equivalent.

If such is found and replaced with an element 335 of a group II-n different from the one which supplied the first replacement, the so-modified word being displayed and accepted by the typist (Key 20R pressed), then the Variable Group Sequencing activities of Subroutine 474R (FIG. 3L) will lead to placing the address offset for the new group II-n first in the corresponding group offset table (e.g. Table 336 or 340, etc.) in the manner described earlier in connection with FIG. 3L.

Detailed description of activities incidental to statistical selection of a category of error having been given and application of related corrective information having been likewise described, presentation of an example may lead to better understanding of the invention.

EXAMPLE

To begin with, assume for simplicity that the typist is a beginner and thus quite prone to typographical errors (Category I) and, somewhat less prone to JPW errors (Category III), the count (508-1) for the former being 14 and 508-2 for the latter being 6, all other categories being at a count of "2". The Total Count in Register 500 will therefore be (20+10) or 30. Assume further that the typist enters the word "kwestion", the sequence of characters containing the improper phonetic equivalent "kw", and the third character (an "e") being the one that caused Alarm Device 19 to be activated.

In accordance with the information above and Appendix D, on pressing A-S Key 302, Table 454 will be found to contain weights of 132, 54 and 12 in bytes 524-1, −2 and −6 respectively, and corresponding Rates of 33, 1 and 12 in the adjacent bytes 526-1, −2 and −6, for quotients of 2, 7 and 5, resulting from division of respective counts into the value 30 in Total Register 500. Upon applying this information in the Getmax routine 453R in FIG. 3J, the value 132 proves to be greater than the initial Zero value in the Maximum Weight Register 360e (another use of the B Register)

and clearly greater than the values in bytes 524-2 and —6. Hence, the Zero transferred into Temporary Register 491 as the category designation from Working Register 496 (per Box 457 of FIG. 3J) will be present in Temporary Register 491 when its content is multiplied by 2 in accordance with the instructions of Box 461 and the resultant product (still Zero) stored as the Offset value 465 in Selection Register 310.

As a result of this value for Offset 465, the first Routine used for correction will be Typographical Errors-Category I (Box 314 in FIG. 4) together with its associated Table 330, both as selected by the Zero offset added to the starting address in Data Pointer 258). Assuming at this point that the statistically most frequent errors of this type (Section 330-1 —i.e., Typo 1 in Appendix A) are still first in Table 330, therefore the "M" character of the first pair 348,350 will be checked successively against all characters in the word "kwestion" stored in Template Register 344, with the exception of the first character. That one is checked only in correction for errors of Categories II, IV and VII, as will be recalled. Furthermore, the word is corrected only up to the bad character—identified by the count in the Bad Character Register 370.

The "M" character 348 not being present in the second or third characters of the word "kwestion", agreement between Bad Character Register 370 and Character Counter 39 causes the next pair in Section 330-1 to be tested. The "R" character 348a likewise being absent in the word, Bad Character Register 370 again causes further character comparisons to be dropped. None of the letter combinations in section 330-1 produce a valid modification upon substitution of a corresponding character 350-n, even if a match occurs, so the search steps to section 330-2 with equally fruitless results. Note that when the EOL code is detected at the end of section 330-1, the passage through Diamond 536 in Spell Mainline Routine 414 takes the NO exit (a valid alternative being in abeyance) to "Update Weight" Box 538 with resultant reduction (Box 532 of FIG. 3I) in the Weight Byte 524-1 from 132 to 99 (the Rate being 33 for Typographical Errors in view of the Count 508-1 being 14 versus a Total of 30). Following this there will be a renewed check for the category with maximum weight using Subroutine 453R (FIG. 3I). The current Weight 99 in Byte 524-1 is still greater than the Weight of 54 in Byte 524-2 so no change in designation of a category occurs.

Because all characters in sections 330-2 and —3 likewise fail either to match the characters or to yield a valid modification, upon finding the EOL code at the end of each section, there will be additionally passes through Subroutine 538r, the Weight 524-1 being successively reduced from 99 to 33 by decrements of 33. Then, on the pass through Getmax Routine 453r following the above-mentioned reduction in Weight Byte 524-1, the Weight value of 54 obtained from Byte 524-2 is found (Diamond 456) to be greater than the 33 present as the "current maximum" in Register 360e as the result of the immediately previous comparison of that Weight of 33 (from Byte 524-1) with the Zero initially in Registrar 360e. Consequently, per Box 457, the value "1" now in Register 496 (because of the incrementation of Register 496 per Box 458 in the previous pass) is transferred to Temporary Register 491. The succeeding passes through Box 459 to Diamond 456 take the NO exit to Box 458, the values in Bytes 524-3 to —7 being smaller than the current maximum (54) in Register 360e.

After all seven bytes 524 have been compared, then the YES exit to Box 461 is taken as previously explained, the "1" presently in Register 491 being multiplied by two and stored in Selection Register 310 as a new Offset 465.

The content of Selection Register 310 having changed, Program 303 selects Category II—Phonetic Equivalents as the next routine and source of corrective information. To this end, the "2" as Offset 465 is added to the starting address of the Table of Routines 451 in the manner described to initiate activities relating to detection of the presence of an erroneous character or string of characters in the word stored in Template Register 344. The same Offset 465 is applied to the starting address of the corrective information tables 330-339 (each including a group offset listing—e.g., 336—preceding it) and thus through the Offset Update Table 478, the DPTR 258 (modified) points to the Offset Pointer Byte 488—initially at Zero. Accordingly, assume for purposes of this example that the sequence for the 54 groups is identical to that in Appendix A—application of the Variable Group Sequencing feature not having occurred, as yet. Then the first group of Phonetic Equivalents is Phon 1 (see Appendix B) but all the characters or strings therein include an "A", hence this group will not yield a match at all. As a result, when the EOL code at the end of section 334-1 is detected, passage through Diamond 536 in Routine 414 (FIG. 3C) again takes the NO exit to Box 538 calling for the Update Weight Subroutine 538R. Offset 465 now being a "2", the Weight and Rate are selected from Bytes 524-2 and 526-2. Further, the Quotient being a 7 (the true value 15 exceeding the limit, as will be recalled), the content of the last-named bytes is 54 and 1, respectively, as stated earlier. Accordingly, when the EOL code at the end of Section 334-1 is read, Diamonds 530, 534 and 536 all elicit a NO answer, so Program 303 again passes through Box 538. The Weight 542-2 is therefore updated by subtracting unit (the Rate 526-2) which leaves the value 53 in Byte 524-2, a value still larger than the 12 in byte 524-3.

On detecting the EOL code, Phon 2 is selected by incrementing Offset Pointer Byte 356 by two units, there being two bytes of address for each Group Offset. When seeking a match with the equivalents in Section 334-2 (Phon 2), the E stored therein will yield a match, but substitution of the strings involving the E and at least one other character (e.g. EA, EI, etc.) will not produce a valid modification. Hence, Program 303 again passes through Box 538, where the Weight in Byte 524-2 will be decremented to 52. The same results apply for Phon 3 to Phon 17, the Weight being dropped successively to a value of 37. This value remains higher than the other six Weights, even though the group of equivalents in Phon 17 contains a matching "k", but again none of the substitutes yield a valid modification. In Phon 18, however, the string "kw" will match the first two characters and the modification involving the equivalent string "qu" will, of course, be valid on checking against Dictionary 56. Consequently, Display Word Flag 412 is set, as is Done Flag 376, and Program 303 passes through Diamonds 530, 534 and 536, the Yes exit of this last being taken to Box 359 where the altered word is stored in the Alternatives (FIFO) Register 548, then through the YES exits of Diamonds 540, 428 and 430 to Box 432, where the alternative word ("question", in this case) is copied into display 16 and Thinking Flag 434 is cleared as a result.

Next, the typist views the corrected word and, presumably recognizing it, presses the Return Key 20R (a key input being detected therefore at Diamond 436). On return to Spell Monitor 402, the pressing of Return Key 20R is established at Diamond 420, the Yes exit leading to Diamond 422, where the YES exit is taken because Display Word Flag 412 is set. That exit leads to Box 424 where the Subroutine 424R of FIG. 3E is followed, according to the invention.

The word "question" being a valid alternative accepted by the typist's pressing of Key 20R, the NO exit from Diamond 462 (FIG. 3E) is followed to Box 466 which calls for updating the statistical counts using Subroutine 466R in FIG. 3K. That routine first points (Box 468) to the byte 508-1 in Table 454 and then uses the Offset 465 from Selection Register 310 to locate the proper count. The current value for the last-named Offset being the "2" present therein at the time the valid modification was found, the proper count is in Byte 508-2 as assumed originally, so it is incremented to a "3" and the augmented value stored in Byte 508-2, followed by a return to the Routine 424R. Therefore, the next activity (Box 474) is the updating of the statistical offsets in Table 478, as detailed in FIG. 3L. There it is seen that the address of the Offset Update Table 478 is first entered in DPTR 258 and the "2" in Offset 465 added to the address in DPTR 258 to locate the starting address of Table 334-Phonetic Equivalents. That starting address is then read and saved in a temporary register as known.

Next, the value in the corresponding Offset Pointer Byte 488 is read (Box 486) and compared (Diamond 490) with the End-of-Table symbol ("FF" in hexadecimal code) to ensure there is no error. Assuming the value is not FFH, Box 492 calls for adding the pointer value (34 in the present circumstances as explained below) to the starting address in DPTR 258 to locate the two bytes of Group Offset in listing 340—this offset being termed the "Correct Offset" herein to distinguish it from Offset 465. These two bytes identify, the start of Section 18 in Table 334 when added to the address in DPTR 258.

As detailed previously, the Variable Group Sequencing or "bubble-up" technique places at the top of each listing (336–340) the Offset data for that one of the Sections of the respective correction Table (366–339) most likely to provide the corrective information leading to a valid word. For this example, the Offset data (2 bytes, as stated earlier) relate to Section 18 (Phon 18 in Appendix B) of Table 334. Section 18 is initially 17 intervals from the first Section (the base address), so the value 34 is normally the offset locating the "Correct Offset"; that is, the address of Section 18: "01 F0", in this instance. Because of the requirement that the elements in Section 18 be tested first as a source of substitute characters subsequent to this example, Section 18 must be located first. Therefore, the corresponding data bytes are placed at the base address, such that a zero value in Group Offset Pointer 488 will locate Section 18 thereafter. Accordingly, to facilitate this move to the top (Box 494), the data bytes "01 F0" for Section 18 are stored in Temporary Register 491. Then, the downshifting process of Box 495 is performed. The data in bytes 32, 33 at the preceding address 32A being transferred to the bytes 34, 35 vacated by transfer of "01 F0" to Temporary Register 491, all as previously described. The newly-vacated bytes being available now for data at the preceding address 30A, the process is repeated until the bytes 0, 1 are vacated by downshifting as above. The "01 F0" in Temporary Register 491 is then transferred therein to complete the "bubble-up" activity. Program 303 then returns to FIG. 3E where Box 498 calls for incrementation of the Total in Register 500, corresponding to the increase in the Count 508-2 in Table 454.

Next, the statistics relevant to Table 454 and Selection Register 310 are recalculated in view of the changes. The change by one unit in a relatively low count has little effect, however, so the Weights and Rates originally assumed as being in Table 454 will be unchanged. The remaining Boxes 529 to 541 in FIG. 3E relate to replacing the incorrect word in memory and in print, both of which may be performed in a known manner and thus, not being immediately relevant to the present invention, need not be discussed further.

While the foregoing description and example have disclosed the invention as providing correction information automatically selected from a number of classes according to the frequency of operator errors which occur in each class, it will nonetheless be clear to those skilled in the art that an operator aware of inherent weaknesses in spelling and typing capabilities could directly select the classes of correction information and their application in any desired sequence. This could be done, for example, by omitting SASM 312 and setting the desired Offset value 465 in Selection Register 310 by pressing, say, CODE key 21 and a respective one of the number keys 0 through 7 simultaneously while in Auto-Spell mode. All other operations would be substantially as described except for those associated with SASM 312, of course. Such a less than fully interactive approach is intended to fall within the inventive concept, although clearly not as preferable as the more efficient approach described in detail herein.

| APPENDIX A | | | | | |
|---|---|---|---|---|---|
| TYPTAB: | TYPO 1 | | | | |
| | TYPO 2 | | | | |
| | TYPO 3 | | | | |
| | TYPO 4 | | | | |
| | EOT | | | | |
| TYPO 1: | MN | (Most frequent | TYPO 4: | BN | (Least |
| | RT | typos) | | CD | frequent |
| | TR | | | CV | typos) |
| | OI | | | DC | |
| | NM | | | DF | |
| | SD | | | DK | |
| | RE | | | EA | |
| | EI | | | ES | |
| | AS | | | ET | |
| | VB | | | FR | |
| | EOL | | | GH | |
| | | | | GT | |
| TYPO 2: | BV | (2nd most fre- | | HG | |
| | DE | quent typos) | | HN | |
| | DS | | | JH | |
| | ER | | | KD | |
| | IE | | | LK | |
| | IO | | | OP | |
| | SA | | | PO | |
| | WE | | | QA | |
| | EOL | | | RF | |
| | | | | RU | |
| TYPO 3: | AE | (3rd most fre- | | SC | |
| | ED | quent typos) | | SE | |
| | EW | | | SW | |
| | FG | | | TG | |
| | GF | | | TY | |
| | IU | | | UY | |
| | KL | | | VC | |
| | LO | | | WS | |
| | OL | | | XC | |

APPENDIX B

```
         UI              ZA
         YT              EOL
         YU
         EOL

PHOTAB:  PHON 1    PHON 50
         PHON 2    PHON 51
         PHON 3    PHON 52
         PHON 4    PHON 53
         .         PHON 54
         .         EOT

PHON 1         AI'      PHON 3         AE'
A as in PAT    AL'      A as in CARE   AI'
               AU'                     AY'
               A'                      A'
               EOL                     EA'
PHON 2         AIG'                    EI'
A as in MANE   AI'                     E'
               AO'                     EOL
               AU'      PHON 4         AH'
               AY'      A as in FATHER AL'
               A'                      AU'
               EA'                     A'
               EIGH'                   EA'
               EIG'                    E'
               EI'                     EOL
               ET'      PHON 13        A'
               EY'      I as in PIT    EE'
               E'                      E'
               EOL                     IA'
PHON 5         BB'                     IE'
B AS IN BIB    BH'                     I'
               B'                      O'
               PB'                     UI'
               EOL                     U'
PHON 6         CH'                     Y'
CH as in CHURCH CZ'                    EOL
               C'       PHON 14        AI'
               TCH'     I as in PIE    AY'
               TI'                     EI'
               TU'                     EY'
               T'                      IE'
               EOL                     IGH'
PHON 7         DD'                     IS'
D as in DEED   D'                      I'
               ED'                     UY'
               TT'                     YE'
               EOL                     Y'
PHON 8         AE'                     EOL
E as in PET    AI'      PHON 15        EA'
               AY'      I as in PIER   EE'
               A'                      EI'
               EA'                     E'
               EI'                     IE'
               EO'                     I'
               E'                      EOL
               IE'      PHON 16        DG'
               OE'      J as in JAR    DI'
               U'                      DJ'
               EOL                     D'
PHON 9         AE'                     GE'
E as in BE     AY'                     GG'
               EA'                     G'
               EE'                     J'
               EI'                     EOL
               EO'      PHON 17        CC'
               EY'      K as in KICK   CH'
               E'                      CK'
               IE'                     CQU'
               I'                      CT'
               OE'                     CU'
               EOL                     C'
PHON 10        FF'                     K'
F as in FIFE   F'                      LK'
               GH'                     QUE'
               LF'                     QU'
               PH'                     Q'
               EOL                     EOL
PHON 11        CKG'     PHON 18        CH'
G as in GAG    GG'      KW as in QUICK CQU'
               GH'                     KW'
```

```
                        GU'                     QU'
                        GUE'                    QW'
                        G'                      EOL
                        EOL      PHON 27        AUE'
PHON 12                 G'       OU as in OUT   AU'
H as in HAT             H'                      HOU'
                        J'                      OUGH'
                        WH'                     OW'
                        EOL                     OU'
PHON 19                 LH'                     EOL
L as in LID             LL'      PHON 28        OO'
                        L'       OO as in TOOK  OU'
                        SL'                     O'
                        EOL                     U'
PHON 20                 CHM'                    EOL
M as in MUM             GM'      PHON 29        EAU'
                        LM'      OO as in BOOT  EU'
                        MB'                     EW'
                        MM'                     IEU'
                        MN'                     OE'
                        M'                      OO'
                        EOL                     OUGH'
PHON 21                 GN'                     OU'
N as in NO              KN'                     O'
                        MN'                     UE'
                        NN'                     UI'
                        NT'                     U'
                        N'                      EOL
                        PN'      PHON 30        PP'
                        EOL      P as in POP    PT'
PHON 22                 NG'                     P'
NG as in THING          NGUE'                   EOL
                        N'       PHON 31        RH'
                        EOL      R as in RACE   RR'
PHON 23                 A'                      WR'
O as in POT             HO'                     R'
                        OU'                     EOL
                        O'       PHON 32        CE'
                        EOL      S as in SAY    C'
PHON 24                 AU'                     PS'
O as in NO              EAU'                    SCH'
                        EO'                     SC'
                        EW'                     SS'
                        OA'                     S
                        OE'                     EOL
                        OH'      PHON 33        CE'
                        OO'      SH as in SHIP  CH'
                        OUGH'                   CI'
                        OU'                     PHS'
                        OWE'                    SCH'
                        OW'                     SCI'
                        O'                      SC'
                        EOL                     SE'
PHON 25                 AL'                     SH'
O as in PAW or          AH'                     SI'
FOR                     AR'                     SSI'
                        AS'                     SS'
                        AU'                     S'
                        AW'                     TI'
                        A'                      EOL
                        OA'      PHON 42        GE'
                        OUGH'    ZH as in JUDGE S'
                        O'                      ZH'
                        EOL                     EOL
PHON 26                 OI'      PHON 43        GKSH'
OI as in NOISE          OY'      X as in JACKS  CKS'
                        EOL                     GZH'
PHON 34                 ED'                     GZ'
T as in TIE             GHT'                    KSH'
                        PT'                     KS'
                        TH'                     X'
                        TT'                     EOL
                        TW'      PHON 44        ABLE'
                        T'       Variations of  ABEL'
                        EOL      ABLE           ABIL'
PHON 35                 OE'                     ABUL'
U as in CUT             OO'                     ABAL'
                        OU'                     EBLE'
                        O'                      EBEL'
                        U'                      EBIL'
                        EOL                     EBUL'
PHON 36                 EAU'                    EBAL'
```

| | | | | | |
|---|---|---|---|---|---|
| | -continued | | | -continued | |
| YOO as in USE | EUE' | IBLE' | PHON 54 | EAK' | |
| | EU' | IBEL' | | EEK' | |
| | EW' | IBIL' | | EKE' | |
| | IEU' | IBUL' | | EQUE' | |
| | IEW' | IBAL' | | IQUE' | |
| | UE' | OBLE' | | EOL | |
| | UI' | OBEL' | | | |
| | U' | OBIL' | | | |
| | YOO' | OBUL' | | | |
| | YOU' | OBAL' | | | |
| | YU' | UBLE' | | | |
| | EOL | UBEL' | | | |
| PHON 37 | EAR' | UBIL' | | | |
| U as in FUR | ER' | UBUL' | | | |
| | EUR' | UBAL' | | | |
| | IR' | EOL | | | |
| | OR' | PHON 45 | CEAN' | | |
| | OUR' | Variations of | CIAN' | | |
| | U' | 'TION | CION' | | |
| | YR' | | SHUN' | | |
| | EOL | | SION' | | |
| PHON 38 | F' | | SSION' | | |
| V as in VALVE | LV' | | TION' | | |
| | PH' | | ZHUN' | | |
| | V' | | ZUN' | | |
| | EOL | | EOL | | |
| PHON 39 | O' | PHON 46 | EAR' | | |
| W as in WITH | U' | Variations of | EER' | | |
| | WH' | EAR | EIR' | | |
| | W' | | IER' | | |
| | EOL | | ERE' | | |
| PHON 40 | I' | | EOL | | |
| Y as in YES | J' | PHON 47 | CI' | | |
| | Y' | | GE' | | |
| | EOL | | PSY' | | |
| PHON 41 | CZ' | | SI' | | |
| Z as in ZEBRA | SC' | | S' | | |
| | SS' | | XY' | | |
| | S' | | ZI' | | |
| | X' | | Z' | | |
| | ZZ' | | EOL | | |
| | Z' | | | | |
| | EOL | | | | |
| PHON 48 | ACE' | | | | |
| | ICE' | | | | |
| | ISE' | | | | |
| | IS' | | | | |
| | IZ' | | | | |
| | USI' | | | | |
| | US' | | | | |
| | EOL | | | | |
| PHON 49 | FIS' | | | | |
| | FIZ' | | | | |
| | PHYS' | | | | |
| | EOL | | | | |
| PHON 50 | CHER' | | | | |
| | CHIR' | | | | |
| | CHURE' | | | | |
| | CHUR' | | | | |
| | TEUR' | | | | |
| | TURR' | | | | |
| | EOL | | | | |
| PHON 51 | CIOUS' | | | | |
| | SEOUS' | | | | |
| | SHIS' | | | | |
| | SHUS' | | | | |
| | TIOUS' | | | | |
| | EOL | | | | |
| PHON 52 | CIN' | | | | |
| | CYN' | | | | |
| | SIN' | | | | |
| | SYN' | | | | |
| | EOL | | | | |
| PHON 53 | ER' | | | | |
| | IR' | | | | |
| | OR' | | | | |
| | OUR' | | | | |
| | RE' | | | | |
| | URE' | | | | |
| | UR' | | | | |
| | YR' | | | | |
| | EOL | | | | |

APPENDIX C

| | |
|---|---|
| Omis 1 | ABCD,EOL |
| Omis 2 | EFGH,EOL |
| Omis 3 | IJKL,EOL |
| Omis 4 | MNOP,(Apostrophe),EOL |
| Omis 5 | QRSTU,EOL |
| Omis 6 | VWXYZ,EOL |

APPENDIX D

| | Quotient | Weight/Rate | | Quotient | Weight/Rate |
|---|---|---|---|---|---|
| Typo | 0 | 240, 60 | Phon | 0 | 216, 4 |
| | 1 | 180, 45 | | 1 | 162, 3 |
| | 2 | 132, 33 | | 2 | 162, 3 |
| | 3 | 120, 30 | | 3 | 108, 2 |
| | 4 | 100, 25 | | 4 | 100, 2 |
| | 5 | 80, 20 | | 5 | 54, 1 |
| | 6 | 60, 15 | | 6 | 54, 1 |
| | 7 | 44, 11 | | 7 | 54, 1 |
| Omis | 0 | 198, 33 | Gen | 0 | 200, 200 |
| | 1 | 144, 24 | | 1 | 150, 150 |
| | 2 | 96, 16 | | 2 | 100, 100 |
| | 3 | 72, 12 | | 3 | 75, 75 |
| | 4 | 48, 8 | | 4 | 50, 50 |
| | 5 | 24, 4 | | 5 | 25, 25 |
| | 6 | 12, 2 | | 6 | 12, 12 |
| | 7 | 6, 1 | | 7 | 1, 1 |

We claim:

1. In a word-processing system of the kind having operator input through a keyboard with a plurality of depressible keys, a spelling dictionary storing valid words within the system, a display, and an error-signal generator activated upon entry of an incorrect word as compared with the valid words of the dictionary; the combination of:

(a) a special key included on said keyboard, (b) storage means holding correction information of at least two kinds, (c) statistical means for controlling the selection order of said at least two kinds of correction information, comprising an individual counter for a respective one of said at least two kinds of correction information, each said counter storing a count dependent upon the relative extent of prior successful usage of each said kind in amending incorrect words previously entered by said operator;

(d) amending means operable to apply to said incorrect word the one of said kinds of correction information first selected by said statistical means, thereby producing therefrom a trial word for presentation on said display, said amending means being responsive to operator depression of said special key as a reaction to generation of an error-signal;

(e) means for adjusting said statistical means to select a second, next-in-order kind of correction information;

(f) a discrete key on said keyboard, depression of said discrete key rejecting said trial word presenting in said display and causing operation of said means for adjusting to supply said next-in-order kind of correction information to said amending means for application thereof to said incorrect word, thereby producing a new trial word for presentation on said display;

(g) a particular key on said keyboard, operator depression of said particular key indicating a trial word currently presented on the display is accepted as a replacement for said incorrect word; and (h) incrementing means for unit incrementation of said individual counter for said next-in-order kind of correction information, said incrementing means responding to said operator depression of the particular key when said new trial word is presented in said display, whereby said statistical means is modified in accordance with the frequency of usage of each said kind of correction information.

2. The word processing system of claim 1, where said new trial word is likewise unacceptable to said operator, and said selected next-in-order kind of correction information comprises a succession of word fragments, each fragment consisting of at least one character, and further including:

(i) address means for locating the start position of said succession of word fragments in said storage means, (j) means responsive to each further depression of said discrete key for incrementing said address means to locate a next word fragment of said succession and for supplying said amending means with said next word fragment thereby to form a further trial word, each said further depression of the discrete key indicating the unacceptability of a previously-formed trial word.

3. The word-processing system of claim 2, wherein said discrete key is the Index key.

4. The word-processing system of claim 2, wherein said succession is exhaustible and further including:

(k) an indicator of exhaustion of said succession of word fragments, and (l) means responsive to said indicator for selecting another of said at least two kinds of correction information for amending said incorrect word to produce yet another trial word.

5. The word-processing system of claim 1, wherein said trial word is unacceptable to said operator, and said kinds of correction information comprises a succession of groups of word fragments, each fragment consisting of at least one character and each group containing a plurality of said fragments followed by an End-of-List code, and further including:

(i) an address table in said storage means listing a succession of starting addresses, one for each said group of word fragments, (j) a pointer cooperating with said table and initially indicating the location storing the starting address of a first of said groups, said starting address identifying a corresponding location storing an initial word fragment in said first group;

(k) means responsive to each additional depression of said discrete key for repeated incrementation of said first group starting address to indicate location of a next word fragment in said first group for supplying said next used fragment to said amending means to form a further trial word utilizing said next word fragment, each additional depression of said discrete key indicating the unacceptability of a previously-formed trial word;

(l) signal means detecting said End-of-List code, and (m) incrementing means for said pointer and responsive to said signal means, to increment said pointer to locate a next one of said groups.

6. The word-processing system of claim 5, wherein said correction information held in said storage means is of the following kinds: (I) typographical correction, (II) phonetic substitutions, (III) replacement of a simply incorrect character, (IV) transposition reversal, (V) insertion of omitted characters, (VI) deletion of extra characters, and (VII) amendment of input garbled by inadvertent shift of the operator's hands relative to the keyboard during said input.

7. The word-processing system of claim 1, wherein said statistical means comprises a plurality of weighting members, each uniquely associated with a respective one of said kinds of correction information and each member containing a numeric value derived from said count in said individual counter for said respective one kind of correction information; and further including:

(i) means for comparing the magnitude of said numeric value contained in each weighting member and determining the maximum value therein, the kind of correction information associated with said weighting member having said maximum value being selected first for use in forming said trial word.

8. The word-processing system of claim 7, further including:

(j) incrementing means for augmenting the numeric value for the one of said weighting members associated with the selected kind of correction information, said incrementing means being responsive to operator acceptance of a trial word as indicated by depression of said particular key.

9. The word processing system of claim 8, wherein said amending means include means for comparing the spelling of said trial word with the spelling of said valid words of said spelling dictionary, said means for comparing issue a signal indicative of a non-valid word in response to disagreement between said trial word and all said valid words, and said weighting member uniquely associated with the selected kind of correction information is decremented in response to each issuance of said signal indicative of a non-valid word.

10. The word processing system of claim 9, wherein correction information of one of said at least two kinds comprises a number of discrete word fragments, each said word fragment consisting of at least one character, and further including means to decrement said weighting member at a rate dependent on said number of word fragments.

* * * * *